(12) United States Patent
Iwami et al.

(10) Patent No.: US 7,639,661 B2
(45) Date of Patent: Dec. 29, 2009

(54) RADIO COMMUNICATION SYSTEM, RADIO COMMUNICATION APPARATUS, RADIO COMMUNICATION METHOD, AND COMPUTER PROGRAM

(75) Inventors: Hideki Iwami, Saitama (JP); Kazuyuki Sakoda, Tokyo (JP); Tomonari Yamagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 10/514,567

(22) PCT Filed: May 11, 2004

(86) PCT No.: PCT/JP2004/006255

§ 371 (c)(1),
(2), (4) Date: Dec. 1, 2004

(87) PCT Pub. No.: WO2004/102887

PCT Pub. Date: Nov. 25, 2004

(65) Prior Publication Data

US 2006/0165024 A1     Jul. 27, 2006

(30) Foreign Application Priority Data

May 16, 2003    (JP)   ............................. 2003-138699

(51) Int. Cl.
*H04J 3/00* (2006.01)
(52) U.S. Cl. ...................................... 370/345; 455/443
(58) Field of Classification Search ........................ None
See application file for complete search history.

(56) References Cited

U.S. PATENT DOCUMENTS

| | | | | |
|---|---|---|---|---|
| 6,980,810 | B1* | 12/2005 | Gerakoulis et al. | 455/450 |
| 7,302,227 | B2* | 11/2007 | Sakoda | 455/41.2 |
| 2002/0167960 | A1* | 11/2002 | Garcia-Luna-Aceves | 370/442 |
| 2004/0114521 | A1* | 6/2004 | Sugaya | 370/238 |
| 2004/0152464 | A1* | 8/2004 | Sugaya | 455/435.1 |
| 2005/0068934 | A1* | 3/2005 | Sakoda | 370/350 |
| 2005/0096031 | A1* | 5/2005 | Sugaya et al. | 455/422.1 |

FOREIGN PATENT DOCUMENTS

JP        9-135254       5/1997

(Continued)

OTHER PUBLICATIONS

U.S. Appl. No. 12/326,929, filed Dec. 3, 2008, Sakoda.

*Primary Examiner*—Chirag G Shah
*Assistant Examiner*—Otis L Thompson, Jr.
(74) *Attorney, Agent, or Firm*—Oblon, Spivak, McClelland, Maier & Neustadt, L.L.P.

(57) ABSTRACT

Each communication station, at least, periodically transmits/receives a beacon at regular intervals and manages the transmission/reception using a neighboring-station list (neighbor list), thereby managing the network of the communications station in a distributed manner. In addition, a save area is provided in which n beacons transmitted/received at regular time intervals are managed in a neighboring-station list, thereby making it easy to schedule list reading/writing processing when the list is updated during the reception of a new beacon. When the network topologies are crossed over, a load for network management can be reduced. Thus, it is possible to provide a wireless communication system in which a system timer and a master station that controls common frame time do not exist in a domain included in the system.

35 Claims, 19 Drawing Sheets

FOREIGN PATENT DOCUMENTS

| | | | |
|---|---|---|---|
| JP | 09135254 A * | 5/1997 | |
| JP | 2000-165930 | 6/2000 | |
| JP | 2000165930 A * | 6/2000 | |
| JP | 2002-64503 | 2/2002 | |
| JP | 2003-249936 | 9/2003 | |

* cited by examiner

Neighbor List for Network ID 0

| Index | Counter | Address | Network ID | NBOI | NBAI | Auth. |
|---|---|---|---|---|---|---|
| 0 | 0 | xxxxx | 0 | xxxx | xxxx | ok |
| 1 | 1250 | xxxxx | 0 | xxxx | xxxx | ok |
| 2 | 2600 | xxxxx | 0 | xxxx | xxxx | ok |
| ... | ... | ... | ... | ... | ... | ... |
| 31 | 38700 | xxxxx | 0 | xxxx | xxxx | ok |

Neighbor List for Network ID 1

| Index | Counter | Address | Network ID | NBOI | NBAI | Auth. |
|---|---|---|---|---|---|---|
| 32 | 625 | xxxxx | 1 | xxxx | xxxx | ok |
| 33 | 1925 | xxxxx | 1 | xxxx | xxxx | ok |
| 34 | 3225 | xxxxx | 1 | xxxx | xxxx | ok |
| ... | ... | ... | ... | ... | ... | ... |
| 63 | 39375 | xxxxx | 1 | xxxx | xxxx | ok |

FIG. 15

Neighbor List for Network ID 0

| Name | Counter | Address | Network ID | NBOI | NBAI | Auth. |
|---|---|---|---|---|---|---|
| 0 | 0 | xxxxx | 0 | xxxx | xxxx | ok |
| 32 | 625 | xxxxx | 1 | xxxx | xxxx | Err |
| 1 | 1250 | xxxxx | 0 | xxxx | xxxx | ok |
| 33 | 1925 | xxxxx | 1 | xxxx | xxxx | Err |
| 2 | 2600 | xxxxx | 0 | xxxx | xxxx | ok |
| 34 | 3225 | xxxxx | 1 | xxxx | xxxx | Err |
| ... | ... | ... | ... | ... | ... | ... |
| 31 | 38700 | xxxxx | 0 | xxxx | xxxx | ok |
| 63 | 39375 | xxxxx | 1 | xxxx | xxxx | Err |

FIG. 16

Neighbor List

| Index | Counter | Address | Network ID | NBOI | NBAI | Auth. | Node ID |
|---|---|---|---|---|---|---|---|
| 0 | 0 | xxxxx | 0 | xxxx | xxxx | ok | - |
| 1 | 625 | xxxxx | 0 | xxxx | xxxx | ok | 0 |
| 2 | 1250 | xxxxx | 0 | xxxx | xxxx | ok | 1 |
| .... | .... | .... | .... | .... | .... | .... | .... |
| 63 | 39375 | xxxxx | 1 | xxxx | xxxx | ok | 15 |

TemporaryNeighbor List

| Index | Counter | Address | Network ID | NBOI | NBAI | Auth. | Node ID |
|---|---|---|---|---|---|---|---|
| 64 | 825 | xxxxx | 1 | xxxx | xxxx | ok | - |
| 65 | 1500 | xxxxx | 1 | xxxx | xxxx | ok | - |
| 66 | 39575 | xxxxx | 1 | xxxx | xxxx | ok | - |
| 67 | 39575 | xxxxx | 1 | xxxx | xxxx | ok | - |
| 68 | 39575 | xxxxx | 1 | xxxx | xxxx | ok | - |

FIG. 19

Neighbor List (Side B)

| Index | Counter | Address | Network ID | NBOI | NBAI | Auth. | Node ID |
|---|---|---|---|---|---|---|---|
| 0 | 0 | xxxxx | 0 | xxxx | xxxx | ok | - |
| 1 | 625 | | 0 | xxxx | xxxx | ok | 0 |
| 2 | 1300 | | 0 | xxxx | xxxx | ok | 1 |
| ... | ... | ... | ... | ... | ... | ... | ... |
| 63 | 39375 | xxxxx | 1 | xxxx | xxxx | ok | 15 |

TemporaryNeighbor List (Side B)

| Index | Counter | Address | Network ID | NBOI | NBAI | Auth. | Node ID |
|---|---|---|---|---|---|---|---|
| 64 | 825 | xxxxx | 1 | xxxx | xxxx | ok | - |
| 65 | 1500 | xxxxx | 1 | xxxx | xxxx | ok | - |
| 66 | 39575 | xxxxx | 1 | xxxx | xxxx | ok | - |
| 67 | 39575 | xxxxx | 1 | xxxx | xxxx | ok | - |
| 68 | 39575 | xxxxx | 1 | xxxx | xxxx | ok | - |

Neighbor List (Side A)

| Index | Counter | Address | Network ID | NBOI | NBAI | Auth. |
|---|---|---|---|---|---|---|
| 0 | 0 | xxxxx | 0 | xxxx | xxxx | ok |
| 1 | 625 | xxxxx | 0 | xxxx | xxxx | ok |
| 2 | 1250 | xxxxx | 0 | xxxx | xxxx | ok |
| ... | ... | ... | ... | ... | ... | ... |
| 63 | 39375 | xxxxx | 1 | xxxx | xxxx | ok |

FIG. 20

# RADIO COMMUNICATION SYSTEM, RADIO COMMUNICATION APPARATUS, RADIO COMMUNICATION METHOD, AND COMPUTER PROGRAM

TECHNICAL FIELD

The present invention relates to wireless communication systems, wireless communication apparatuses, wireless communication methods, and computer programs which mutually perform communication between a plurality of wireless communication stations in a wireless LAN (Local Area Network) or the like. In particular, the present invention relates to a wireless communication system, a wireless communication apparatus, a wireless communication method, and a computer program for operation of a wireless network through asynchronous direct communication (random access) of terminal apparatuses.

More specifically, the present invention relates to wireless communication systems, wireless communication apparatuses, wireless communication methods, and computer programs for construction of a wireless network through ad-hoc (ad-hoc) communication without the relationship of a controlling station and a controlled station. In particular, the present invention relates to a wireless communication system, a wireless communication apparatus, a wireless communication method, and a computer program for appropriately forming a wireless network without communication stations interfering with each other.

BACKGROUND ART

Connecting a plurality of computers to constitute a LAN allows for sharing of information such as files and data, allows for sharing of peripheral equipment such as a printer, and allows for information exchange such as the transfer of electronic mail and/or data content.

Conventionally, a fiber-optic cable, a coaxial cable, or a twisted-pair cable has been used to provide a wired LAN. In such a case, however, line installation work is required, which makes it difficult to readily construct a network. In addition, the cabling is messy. After the LAN is constructed, the movement range of equipment is limited by the cable length, which is inconvenient.

Accordingly, a scheme for freeing users from the wiring of a wired-system LAN, wireless networks are gaining attention. Since the wireless networks can omit a majority of wire cables in work spaces such as offices, communication terminals such as personal computers (PCs) can be moved with relative ease.

In recent years, in conjunction with an increased speed and reduced cost of wireless LAN systems, demands thereon have increased considerably. In particular, recently, in order to construct a small-scale wireless network with multiple pieces of electronic equipment available around people to perform information communication, the incorporation of a personal area network (PAN) is under consideration. For example, frequency bands, such as a 2.4 GHz band, a 5 GHz band, and so on, that do not require a license of a regulatory agency, are utilized to define different wireless communication systems.

A method that is typically used to configure a local area network using a wireless technology is that one apparatus that serves as a controlling station, called an "access point" or a "coordinator", is provided in an area to form a network under the centralized control of the controlling station.

In a wireless network in which an access point is arranged, an access control method based on bandwidth reservation is widely employed. That is, in the method, when one communication apparatus transmits information, it first makes a reservation with the access point for a bandwidth required for the information transmission and uses a transmission path so that the information transmission does not collide with information transmission of another communication apparatus. Thus, with the arrangement of the access point, the communication apparatuses in the wireless network can perform wireless communication in a synchronous manner, i.e., in synchronization with each other.

However, in a wireless communication system in which an access point exists, when asynchronous communication is performed between a transmitting-side communication apparatus and a receiving-side communication apparatus, wireless communication that always goes through an access point is required. Thus, there is a problem in that the use efficiency of the transmission path is reduced by half.

As opposed to it, as another method for forming a wireless network, "ad-hoc (ad-hoc) communication", in which terminals perform communication directly with each other in an asynchronous manner, has been devised. In particular, in a small-scale wireless network constituted by a relatively small number of clients located in the neighbor, the ad-hoc communication that allows arbitrarily terminals to perform asynchronous wireless communication directly with each other without the use of a specific access point is considered to be appropriate.

Examples of typical standards related to the wireless network include IEEE (The Institute of Electrical and Electronics Engineers) 802.11 and IEEE 802.15.3. With regard to the IEEE 802.11 standard, various wireless communication systems, such as an IEEE 802.11a standard, IEEE 802.11b, and so on, are available, depending on a difference in a wireless communication system and a frequency band used.

In addition, recently, as a wireless communication system for achieving short-distance ultrahigh-speed transmission, a system, called "ultra-wide band (UWB) communication", for performing wireless communication by sending information over a series of considerably weak impulses has been gaining attention, and it is anticipated that the system is put to practical use (e.g., refer to Non Patent Document 1).

The UWB transmission system can be divided into two types, namely, a DS-UWB system, in which the spreading speed of a DS information signal is increased to the limit, and an impulse-UWB system, in which an information signal is formed of a series of impulse signals having a very short period, i.e., a period of about several hundred picoseconds, and the series of signals is transmitted/received. Either of the systems performs transmission/reception by spreading the signals at an ultra-high frequency spectrum as high as 3 GHz to 10 GHz, thereby achieving high-speed data transmission. The occupied bandwidth is on the order of GHz such that a value obtained by dividing the occupied bandwidth by the center frequency (e.g., 1 GHz to 10 GHz) thereof is substantially "1" and is an ultra-wide band compared to a bandwidth typically used in a wireless LAN using the so-called a W-CDMA or cdma2000 system or an SS (spread spectrum) or OFDM (orthogonal frequency division multiplexing) system.

For example, a method for performing communication by forming a piconet between wireless communication apparatuses that perform ultra-wide band wireless communication is being standardized in IEEE 802.15.3 standardization work.

Now, details of conventional wireless networking will be described in connection with an example of IEEE 802.11.

IEEE 802.11 networking is based on the concept of a BSS (Basic Service Set). The BSS is constituted by two types of BSS, namely, a BSS defined by an infrastructure mode in which a master, such as an AP (access point: controlling station), exists and an IBSS (Independent BSS) defined by an ad-hoc mode in which only a plurality of MTs (mobile terminals: mobile stations) constitute a network.

Infrastructure Mode

The operation of IEEE 802.11 in infrastructure mode will be described with reference to FIG. 24. For the BSS in infrastructure mode, an AP is essential in the wireless communication system to perform coordination.

The AP organizes, as a BSS, a range in which radio waves reach in the neighbor of the 'self' station, and provides a "cell" referred to in the so-called cellular system. MTs that exist in the neighbor of the AP are covered by the AP to thereby join the network as members of the BSS. Thus, the AP transmits a control signal, called a beacon, at appropriate time intervals. In turn, an MT that can receive the beacon recognizes that the AP exists in the neighbor, and further establishes a connection with the AP.

In the example shown in FIG. 24, a communication station STA0 operates as an AP and other stations STA1 and STA2 operate as MTs. The communication station STA0, which serves as an AP, transmits a beacon (beacon) at regular time intervals, as depicted in the chart at the right-hand side in the figure. The transmission time of a next beacon is indicated in the beacon in the format of a parameter called target beacon transmit time (TBTT: target beacon transmit time). When time reaches the TBTT, the AP operates a beacon transmission procedure.

Upon receiving the beacon, each neighboring MT decodes a TBTT field therein to thereby allow the recognition of next beacon transmission time. Thus, in some cases (when there is no need for reception), the neighboring MT may power off the receiver to enter a sleep state until receiving a next TBTT or a TBTT subsequent thereto.

Ad-Hoc Mode

The operation based on IEEE 802.11 during the other mode, i.e., the ad-hoc mode, will now be described with reference to FIGS. 25 and 26.

With respect to an IBSS in ad-hoc mode, after negotiating with each other, a plurality of MTs autonomously define an IBSS. After the IBSS is defined, the MT group specifies the TBTT at regular time intervals. Each MT refers to the clock of the self station to recognize the arrival of the TBTT. Then, when recognizing that nobody has transmitted a beacon yet after a delay of random time, the MT transmits a beacon.

FIG. 25 shows a state in which two MTs constitute the IBSS. In this case, any one of the MTs belonging to the IBSS transmits a beacon every time the TBTT arrives. Beacons transmitted from the MTs may collide with each other.

Also, in the IBSS, the MTs may enter the sleep state in which the transceiver is powered off, as needed. FIG. 26 shows a signal transmission/reception procedure in such a case.

In the IBSS in IEEE 802.11, when the sleep mode is used, some period of time after the TBTT is defined as an ATIM (announcement traffic indication message) window. During the period of the ATIM window, all MTs belonging to the IBSS perform reception processing. During this period of time, in essence, an MT that is operating in the sleep mode can also perform reception.

When the self station has information addressed to someone, each ME transmits an ATIM packet to the one after transmitting a beacon in the time period of the ATIM window, so that the reception side is notified that the self station has information addressed to the one. An MT that has received the ATIM packet keeps the receiver in operation until reception from the station that has transmitted the ATIM packet is completed.

In the example shown in FIG. 26, three MTs STA1, STA2, and STA3 exist in the IBSS. In the figure, upon the arrival of the TBTT, each of the MTs STA1, STA2, and STA3 operates a backoff timer, while monitoring the medium state for a random time. In the illustrated example, the timer of the MT STA1 expires earliest and the MT STA1 transmits a beacon. Since the MT STA1 transmits a beacon, the MTs STA2 and STA3 that receive the beacon are adapted not to transmit beacons.

In the examples shown in FIG. 26, the MT STA1 holds transmission information addressed to the MT STA2 and the MT STA2 holds transmission information for the MT STA3. In this case, after transmitting or receiving the beacons, the MTs STA1 and STA2 operate the backoff timers again while monitoring the respective medium states for a random period of time. In the illustrated example, since the timer of the MT STA2 expires earlier, the MT STA2 first transmits an ATIM message to the MT STA3. Upon receiving the ATIM message, the MT STA3 feeds back information indicating the reception to the MT STA2 by transmitting an ACK (acknowledge) packet. When the MT STA 3 finishes the transmission of the ACK, the MT STA1 further operates the backoff timer while monitoring the state of each medium for a random period of time. When the timer expires, the MT STA1 transmits an ATIM packet to the MT STA2. The MT STA2 performs feedback by returning an ACK packet indicating the reception to the MT STA1.

In a period after the ATIM packet and the ACK packet are exchanged in the ATIM window, similarly, the MT STA 3 operates the receiver to receive information from the MT STA2 and the station STA2 operates the receiver to receive information from the MT STA1.

In the above-described procedure, a communication station that does not receive an ATIM packet in the ATIM window or that does not hold transmission information addressed to someone can power off the transceiver until the next TBTT to reduce power consumption.

The present inventors consider that such a wireless networking operation has mainly three problems.

The first problem is collision due to a change in the radio-wave propagation environment.

For example, suppose a situation in which systems that have formed respective networks approach each other, as shown in FIG. 27. In the upper section in FIG. 27, a network constituted by communication stations STA0 and STA1 and a network constituted by communication stations STA2 and STA3 exist in ranges where radio waves do not reach due to a shield, such as a wall and/or door, which are not shown. Thus, the communication stations STA0 and STA1 communicate with each other, and, completely independently thereof, the communication stations STA2 and STA3 communicate with each other. The beacon transmission timing of each communication in this case is shown at the right side in the upper section in FIG. 27.

In such a communication environment, suppose a case in which the door that has been providing a shield between the networks opens and those stations, which have not recognized each other, recognize each other. The lower section of FIG. 27 shows a case in which the stations STA0 and STA1, which have been communicating completely independently, and the stations STA2 and STA3 are put in state in which they can communicate with each other. In this case, as shown at the right side in the lower section in FIG. 27, beacons from the respective stations collide with each other.

With the widespread use of information equipment such as personal computers (PCs), it can be presumed that communications stations are ubiquitous in a work environment where a large number of pieces of equipment coexist in an office. In such a situation, network construction based on IEEE 802.11 will now be discussed.

When a network is construed in the infrastructure mode, the issue is selection as to which communication station should be operated as the AP (i.e., coordinator). According to IEEE 802.11, an MT included in a BSS communicates with only a communication station belonging to the same BSS and the AP works as a gateway for another BSS. In order to conveniently network the entire system, it is necessary to make a schedule for the system of the entire network in advance. However, in an environment such as a home network where the user gets across between communication stations or the radio-wave propagation environment frequently changes, it is impossible to overcome issues, such as the issue of selecting, as the AP, a communication station located at which position and the issue of how to re-constitute the network when the AP is powered off. Thus, it can be assumed that it is preferable to be able to construct a network without any coordinator, but such a demand cannot be met in the IEEE 802.11 infrastructure mode.

The second problem is collision resulting from a network environment change due to a mobile terminal.

As in the case of FIG. 27, a situation in which systems that have formed respective networks approach each other will be discussed with reference to FIG. 28. The operation states of communication stations STA0 to STA3 are analogous to the case shown in FIG. 27. In such a communication environment, suppose a case in which a user moves his/her communication station to thereby cause communication stations, which have not recognized each other, to recognize each other, because of the presence of a communication station STA4.

As shown in the lower section in FIG. 28, when each communication is put in a state that allows transmission and reception, beacons from the respective stations except the station STA4 collide with each other. In connection with this problem, in the IEEE 802.11 standard, the station STA4 can receive both signals from a first network (IBSS-A) and signals from a second network (IBSS-B). When the information of beacons is mutually read, the networks break down. As a result, the station STA4 needs to operate in accordance with rules for the IBSS-A and the IBSS-B, and the possibilities of beacon collision and ATIM packet collision exist in anyway. Although it is desired that a network can be constructed without a need for a coordinator (as described above), such a demand cannot be met in the IEEE 802.11 infrastructure mode.

The third problem is a configuration for managing a network in which the loads of communications are low.

Now, neighboring-station information (a neighbor list) of a communication station having a coordinator function will be described. Typically, a communication station having a coordinator function transmits a beacon to notify neighboring stations about network information. Since the coordinator performs overall management of the network, the loads of the neighboring stations are reduced. In contrast, when the first and second problems in the networking are considered, it is desirable that a network without a coordinator be constructed in, particularly, a home network. In such a case, each communication station needs to have a neighbor list. However, as the number of neighboring stations that each neighboring station can handle increases, the load of each neighboring station increases. This can lead to a load on the entire network.

Accordingly, it is necessary to consider a low-load configuration for managing a network.

[Non Patent Document 1]

Nikkei Electronics, issue of Mar. 11, 2002, "First Cry of Wireless Revolution, Ultra Wideband (Ubugoe-wo-ageru Musen-no-Kakumeiji Ultra Wideband)" (pp. 55-66).

DISCLOSURE OF INVENTION

Problems to be Solved by the Invention

An object of the present invention is to provide a superior wireless communication system, a wireless communication apparatus, a wireless communication method, and a computer program which can preferably construct a network through ad-hoc communication without the relationship of a controlling station and a controlled station.

Another object of the present invention is to provide a superior wireless communication system, a wireless communication apparatus, a wireless communication method, and a computer program which can preferably form an appropriate wireless network in a communication environment in which a plurality of ad-hoc networks are adjacent to each other, without communication terminals interfering with each other across the networks.

Further object of the present invention is to provide a superior wireless communication system, a wireless communication apparatus, a wireless communication method, and a computer program which can preferably form a wireless network in a communication environment in which a plurality of ad-hoc networks are adjacent to each other, with a low-load configuration for managing a network.

Means For Solving The Problems

The present invention has been made in view of the foregoing problems, and a first aspect of the present invention provides a wireless communication system that performs a communication operation without the relationship of a controlling station and a controlled station.

In the wireless communication system, each communication station transmits a beacon signal at a predetermined frame period and manages a neighboring station in accordance with beacon reception timing from another communication station.

The "system" herein refers to a logically assembled unit of a plurality of apparatuses (or functional modules that realize specific functions) and individual apparatuses or functional modules may or may not be provided in a single housing.

In the wireless communication system according to the present invention, no coordinator is particularly arranged and the relationship of a controlling station and a controlled station does not exist between the communication stations. By sending beacon information, each communication station notifies another communication stations in the neighbor (i.e., in the communication range) about the presence of the self and the network configuration. A communication station that newly enters the communication range of another communication station receives a beacon to thereby detect that the communication station is already in the communication range. Further, by decoding information described in the beacon, the communication station can recognize the network configuration.

When no communication station exists in the neighbor, the communication station can start transmitting the beacon at appropriate timing. Thereafter, a communication station that newly enters the communication range sets its own beacon transmission timing so that it does not collide with the existing beacon topology. In this case, each communication station acquires a priority use period immediately after the beacon transmission and beacons are placed in accordance with an algorithm in which the transmission timing of a beacon of a newly joining station is sequentially set at substantially the center timing of the beacon interval set by existing communications.

Each communication station describes its own beacon reception timing in a neighboring beacon information field in the beacon and creates a neighboring-station list regarding the beacon placement of neighboring stations in a frame period in accordance with the own beacon reception timing and a description in the neighboring beacon offset information (NBOI: neighboring beacon offset information) field, thereby managing the network.

The beacon collision avoidance function based on the description in the NBOI field can avoid beacon collision by keeping a track of the beacon position of a hidden terminal, i.e., a neighboring station that is two hops away.

In an environment in which the networks exist in a range in which a shied, such a wall and/or a door, prevents radio waves from reaching, when the door opens to clear the shield, a crossover state, i.e., a state in which the systems approach each other suddenly, occurs. For each network system, the actual transmission timing of beacons is intentionally shifted from timing defined by a predetermined time period, to thereby prevent sequential collision of beacons in the crossover state.

In the crossover state, there is a possibility that beacon transmission timings of plurality of stations are set at substantially the same time. Each communication station issues a request for changing beacon transmission timing when a station that overlaps beacon reception timing managed in the neighboring-station list managed by the self appears. In turn, a communication station that receives the request finds time at which no beacon is placed in the frame period and sets its own beacon transmission timing again. Alternatively, when a station whose beacon transmission timing overlaps beacon reception timing managed by its own neighboring-station list, each communication station may find time at which no beacon is placed in the frame period, set its own beacon transmission timing again, and transmit a message notifying of the change in the beacon position.

Each communication station also manages the network in accordance with a neighboring-station list in which beacon reception timing information from a neighboring station that can be placed in the frame period and a save list of a neighboring station that cannot be arranged in the frame period.

When the neighboring-station list is configured such that a beacon of only one communication station can be described for each minimum beacon interval and the time axis and the number of rows in the list correspond to each other, the hardware and the software can more reliably perform scheduling for writing and reading. In the crossover state, for a case in which the beacon transmission timings of a plurality of stations are set at substantially the same time, beacon information that is redundantly transmitted to (received at) the same beacon position is described in a save neighboring-station list.

Each communication station may also have a first neighboring-station-list storage area for writing, in a communication-protocol lower layer, newly-received beacon reception timing and a second neighboring-station-list storage area for writing, in a communication-protocol upper layer, a neighboring-station list in which the beacon reception timing information from a neighboring station that can be placed in the frame period and a save list of a neighboring station that can be placed in the frame period.

When the first neighboring-station-list storage area for writing of the communication-protocol lower layer and the second neighboring-station-list storage area for writing of the communication-protocol upper layer are provided independently of each other, the neighboring-station list can be reliably managed without the collision of respective write timings.

In such a case, the communication-protocol upper layer may write the beacon reception timing information described in the first neighboring-station-list storage area to the neighboring-station list or the neighboring-station save list in the second neighboring-station-list storage area, and may schedule the beacon placement in the frame period by issuing a request for changing the beacon transmission timing until the communication station described in the neighboring-station save list is relocated to the neighboring-station list.

A second aspect of the present invention provides a computer program that is written in a computer-readable format so as to cause processing for operation in a wireless communication environment without the relationship of a controlling station and a controlled station to be executed on a computer system. The computer program includes:

a beacon-signal issuing step of issuing a beacon signal at each predetermined frame period in own communication range; and a neighboring-station managing step of managing a neighboring station in accordance with beacon reception timing from another communication station.

The computer program according to the second aspect of the present invention defines a computer program written in a computer-readable format so as to achieve predetermined processing on a computer system. In other words, when the computer program according to the second aspect of the present invention is installed onto a compute system, a synergistic effect occurs on the computer system, so that the computer program operates in a wireless communication environment in which a specific controlling station is not arranged. This can provide the same advantages as the wireless communication system according to the first aspect of the present invention.

Further objects, features, and advantages of the present invention will become apparent from detailed descriptions based on the following embodiments of the present invention and the accompanying drawings.

Advantages

In a communication environment in which a plurality of ad-hoc networks are adjacent to each other, the present invention can provide a superior wireless communication system, a wireless communication apparatus, a wireless communication method, and a computer program which can preferably form an appropriate wireless network without communication terminals interfering with each other across the networks.

In a communication environment in which a plurality of ad-hoc networks are adjacent to each other, the present invention can provide a superior wireless communication system, a wireless communication apparatus, a wireless communication method, and a computer program which can preferably form a wireless network with a low-load network management configuration.

According to the present invention, in a wireless communication system in which a system timer and a master station that controls common frame time do not exist in a domain included in the system, each communication station, at least, periodically transmits/receives a beacon at regular intervals, and manages the transmission/reception using a neighboring-station list (a neighbor list). This makes it possible to manage the network of the communications station in a distributed manner. In addition, a mechanism for managing n beacons (n is an integer greater than or equal to one) transmitted/received at regular time intervals, using a neighboring-station list, is provided and a save area for receiving a number of beacons which is greater than n at the regular time intervals is provided. As a result, there is an advantage in that hardware (during reception of a new beacon) and the software (during update of the list) can easily schedule the list reading/writing processing to thereby prevent occurrence of a failure in the neighboring-station list. Further, this arrangement makes it possible to perform operation without a failure, even when a high-load situation for managing the network, such as a situation in which network topologies are crossed over, arises.

BEST MODE FOR CARRYING OUT THE INVENTION

Embodiments of the present invention will be described below in detail with reference to the drawings.

A communication transmission path intended in the present invention is a wireless path, and a plurality of communication stations construct a network through the use of a single transmission medium (when a link is not divided by frequency channels). The advantages of the present invention, however, can equally be offered even when a plurality of frequency channels exist as transmission media. Further, the present invention is intended for store-and-forward traffic communication, through which information is transferred in units of a packet.

A wireless network system according to the present invention has a system configuration in which no coordinator is arranged. Each communication station essentially performs ad-hoc communication, in which it directly transmits information in an asynchronous manner in accordance with an access procedure based on CSMA (Carrier Sense Multiple Access).

In such a wireless communication system in which a coordinator is not particularly arranged, each communication station sends beacon information to notify other communication stations in the neighbor (i.e., in the communication range) about the presence of the self and the network configuration. A communication station that newly enters the communication range of another communication station receives a beacon to thereby detect that the communication station is already in the communication range. Further, by decoding information described in the beacon, the communication station can recognize the network configuration.

In order to solve the problems in constructing an autonomous distributed network without a controlling-and-controlled relationship such as the relationship of a master station and a slave station, a network is constructed by causing individual communication stations to mutually transmit beacons in which information regarding the network is described. Thus, based on the information described in the beacons, each communication can perform high-level determination on the communication states and so on of other stations. Details of this point are described in, for example, International Application (PCT/JP2004/001065, international filling data: Feb. 3, 2004) already assigned to the present applicant.

Processing at each communication station described below is essentially executed by every communication station that enters a network. As the case may be, however, not all communication stations that constitute the network execute the processing described below.

FIRST EMBODIMENT

FIG. 1 schematically shows the functional configuration of a wireless communication apparatus that is capable of operating as a communication station in a wireless network according to the present invention.

In the wireless communication apparatus shown in the figure, an antenna 1 is connected to a reception processing unit 3 and a transmission processing unit 4 via an antenna duplexer 2. The reception processing unit 3 and the transmission processing unit 4 are connected to a baseband unit 5. Various communication systems that are applicable to, for example, a wireless LAN and that are suitable for relatively short-distance communication can be used for the reception processing system of the reception processing unit 3 and the reception processing system of the transmission processing unit 4. Specifically, a UWB system, an OFDM system, or a CDMA system can be used.

The baseband unit 5 includes an interface unit 6, a MAC (media access control) unit 7, a DLC (data link control) unit 8, and so on. Each processing unit executes processing for a corresponding communication protocol layer in an access control system implemented in the communication system.

An operation that is executed by the wireless communication apparatus in the wireless network system according to the present invention will now be described. In a wireless communication environment in which no coordinator exists, each communication station periodically transmits a beacon in order to notify the neighbors (i.e., in its own communication range) about the presence of the self. Each communication station can acquire a predetermined time period immediately after transmitting the beacon, as a priority use period that the self can use to transmit (send and/or receive) information with priority.

For example, each communication station in the network transmits a beacon in which information regarding the network is described, so as to set a state for performing a reception operation in the time periods prior or subsequent to the transmission of the beacon signal. When each communication station in the network has no transmission/reception data, the system can be configured so as to require minimum transmission/reception operations. Further, when the transmission/reception operation state is changed according to a varying amount of transmission/reception data, the data can be transferred with a minimum latency with a minimum level of necessary transmission/reception operation. This point is described in detail in, for example, International Application (PCT/JP2004/001027, international filling data: Feb. 3, 2004) already assigned to the present applicant.

A period that is defined by the beacon transmission will be referred to as a "superframe period". In the present embodiment, the beacon transmission period of the communication station is set to 40 milliseconds and thus the beacons are transmitted at an interval of 40 milliseconds. The superframe period, however, is not limited to 40 milliseconds.

A beacon transmission procedure of each communication station according to the present embodiment will now be described with reference to FIG. 2.

When it is assumed that information transmitted by a beacon is 100 bytes (the transmission rate is 100 Mbps, the preamble is 8 microseconds, and the physical (PHY) header is 2 microseconds), the amount of time required for the transmission is 18 microseconds. Since the beacon is transmitted once in 40 milliseconds, the medium occupancy ratio of beacon of each communication station is 1/2222, which is sufficiently small.

While listening to the beacon oscillated in the neighbor, each communication station gradually performs synchronization. When a new communication station appears, the new communication station sets its own beacon transmission timing so that it does not collide with the beacon transmission timing of the existing communication station.

When no communication station exists in the neighbor, a communication station 01 can start transmitting the beacon at appropriate timing. The beacon transmission interval is 40 milliseconds (as described above). In the example shown in the uppermost row in FIG. 2, B01 indicates the beacon transmitted from the communication station 01.

Thereafter, a communication station that newly enters the communication range sets its own beacon transmission timing so that it does not collide with the existing beacon topology. In this case, since each communication station acquires a priority use period immediately after the transmission of the beacon, it is preferable in terms of transmission efficiency that the beacon transmission timings of individual communication stations are equally distributed in a superframe period rather than being concentrated. Thus, the present embodiment is essentially adapted such that the beacon transmission is started at substantially the center of a time period in which the beacon interval is the longest in a range where the self can hear beacons.

For example, suppose that a new communication station 02 appears in a network state in which only the communication station 01 exists, as shown in the uppermost row in FIG. 2. In this case, the communication station 02 receives the beacon from the communication station 01 to recognize the presence thereof and the beacon position. Then, as shown in the second row in FIG. 2, the communication station 02 sets its own beacon transmission timing at substantially the center of the beacon interval of the communication station 01 and starts beacon transmission.

Further, suppose that a new station 03 appears. In this case, the communication station 03 receives at least one of the beacons transmitted from the respective communication stations 01 and 02 to recognize the presence of the existing communication stations. Then, as shown in the third row in FIG. 2, the communication station 03 starts the transmission at substantially the center timing of interval of the beacons transmitted from the communication stations 01 and 02.

Thereafter, the beacon interval is reduced in accordance with the same algorithm, every time a new station joins newly in the neighbor. For example, as shown in the lowermost row in FIG. 2, a communication station 04 that appears next sets its beacon transmission timing at substantially the center timing of the beacon intervals set by the respective communication station 02 and 01. Further, a communication station 05 that appears next sets its beacon transmission timing at substantially the center of the beacon intervals set by the respective communication stations 02 and 04.

However, in order to prevent the band (the superframe period) from being overflowed with beacons, a minimum beacon interval $B_{min}$ is specified so that the placement of two or more beacon transmission timings in $B_{min}$ is not permitted. For example, when the minimum beacon interval $B_{min}$ is specified to be 625 microseconds, only up to 64 communication stations can be accommodated in a range in which radio waves reach.

FIG. 3 shows one example of the beacon transmission timing. In the example in the figure, the passage of time and the placement of beacons in a 40-millisecond superframe period are expressed like a clock whose hour hand moves clockwise along a ring.

In the example shown in FIG. 3, a total of 16 communication stations, i.e., a communication station 0 to a communication station F, are provided as nodes in the network. As described above with reference to FIG. 2, suppose that beacons are placed in accordance with the algorithm the beacon transmission timing of a newly joining station is sequentially set at substantially the center timing of the beacon intervals set by the existing communication stations. When $B_{min}$ is defined to be five milliseconds, any more communication station cannot join the network. A phase in which the beacon of each communication station is placed in accordance with the above-described procedure and the transmission of the beacon is started will hereinafter be referred to as "step 1".

The wireless network according to the present embodiment essentially employs an access procedure based on CSMA as in the conventional manner and is designed to perform transmission after confirming that medium is cleared. Each communication station, however, is assigned a priority use period in which it can transmit information with priority, after transmitting a beacon signal for notifying other neighboring communication stations about the presence of the self.

As in the case of an IEEE802.11 system or the like, a plurality of packet intervals are also defined in the present embodiment. The definition of the packet intervals in this case will now be described with reference to FIG. 4. As the packet intervals in this case, a short inter-frame space (SIFS) and a long inter-frame space (LIFS) are defined. Only packets to which priority is given are permitted to be transmitted at the SIFS packet interval. The transmission of the other packets is permitted after confirming that a medium corresponding to a packet interval for "LIFS+random backoff that provides a random value" is cleared. As the method for calculating the random backoff value, a known method in existing techniques is used.

In the present embodiment, "LIFS" and "FIFS"+backoff" (FIFS: far inter-frame space) are further defined, in addition to the "SIFS" and the "LIFS+backoff" packet intervals described above. Typically, the "SIFS" and "LIFS+backoff" packet intervals are used. However, in a time period in which a certain communication station is given priority for transmission, the station that is given the priority uses the SIFS or LIFS packet interval, while other stations use the "FIFS+backoff" packet interval.

Each communication station transmits a beacon at regular time intervals, and after the beacon transmission, the station that has transmitted the beacon is given priority for transmission for a while. FIG. 5 shows a state in which priority is given to a station that transmits a beacon. The priority period is defined as a "transmission guaranteed period (TGP)". Periods other than the TGP is defined as "fairly access periods (FAPs)". FIG. 6 shows the structure of the superframe period. As shown in the figure, subsequent to the transmission of a beacon from each communication station, the TGP is assigned to the communication station that has transmitted the beacon. When time corresponding to the length of the TGP elapses, the FAP starts, and when a beacon from a next communication station is transmitted, the FAP ends. Although one example in which the TGP starts immediately after the beacon transmission has been here, the present invention is not limited thereto. For example, the start time of the TGP may be set at a relative position (time) from the time of beacon transmission.

Now, the packet interval will be discussed below again. In the FAP, each communication station performs transmission at the LIFS+backoff interval. With regard to the transmission of a beacon and packets in the TGP of the self station, each communication station is also permitted to transmit them at the SIFS interval. With regard to the transmission of packets in the TGP of the self station, each communication station is also permitted to transmit them at the LIFS interval. Further, with regard to the transmission of packets in the TGP of another station, each communication station transmits them at the FIFS+backoff interval. In the IEEE 802.11 standard, the "FIFS+backoff" has always been used as the packet interval. The configuration according to the embodiment, however, can reduce the interval and can efficiently manage the superframe period to achieve more effective packet transmission.

Although the above description has been given of a case in which only a communication station in the TGP is given transmission priority, transmission priority may also be given to a communication station that is called up by the communication station in the TGP. While the transmission is basically prioritized in the TGP, when the 'self' communication station has nothing to transmit but knows that another station has information it wants to transmit to the self station, the self station may issue a paging (paging) message or a polling (polling) message to the "another station".

Conversely, even though after transmitting a beacon, there is a case in which the self station has nothing to transmit and does not know that another station has information it wants to transmit to the self station. In such a case, the self station does nothing, abandons the transmission priority given in the TGP, and transmits nothing. In response, after the LIFS+backoff or FIFS+backoff elapses, another station starts transmission even in the time period.

When the configuration in which the TGP immediately follows the beacon, as shown in FIG. 6, is considered, it is preferable in terms of transmission efficiency that the beacon transmission timings of the communication stations are equally distributed in the superframe period rather than being concentrated. Thus, the present embodiment is essentially adapted such that the beacon transmission is started at substantially the center of a time period in which the beacon interval is the longest in a range where the self can hear the beacon. The beacon placement method, however, is not limited to what is described above. For example, when the start time of the TGP can be set at relative time from the beacon transmission time, the individual beacons may be put together in one part or the beacons of several stations may be put together. With the beacons put together in that manner, the transmission of a single beacon may serve as the transmission of beacons of multiple stations.

FIG. 7 shows an example of the structure of a packet format in the wireless network system according to one embodiment of the present invention.

A preamble that includes a unique word is added to the front-end of a packet in order to notify of the presence of the packet.

A heading portion is transmitted immediately after the preamble and contains the attribute, the length, and the transmission power of the packet, as well as the transmission rate of a payload portion when the PHY is in a multiple-transmission-rate mode. The heading portion, i.e., a PHY header, has been processed by reducing the transmission speed so that a required SNR (signal-to-noise ratio) is about a few dB lower than that of the payload portion, thereby becoming less error-prone. The heading portion is different from the so-called MAC header. In the illustrated example, the MAC header is contained in the payload portion.

When access control is performed while avoiding collision based on signals detected, such a heading portion, which has been processed to be less error-prone as described above, may include at least information necessary for extracting the payload information of the packet and a field for controlling packet-transmission access reservation resulting from the packet transmission. Such an arrangement can allow for processing using the field. This point is described in detail in, for example, International Application (PCT/JP2004/001028, international filling data: Feb. 3, 2004) already assigned to the present applicant.

The payload portion is a portion indicated as a PSDU (PHY Service Data Unit) and contains a bearer bit string including a control signal and information. The PSDU is constituted by the MAC header and a MSDU (MAC Service Data Unit) and contains a data string passed from a higher layer to the MSDU portion.

For more detailed description, it is now assumed that the length of the preamble is 8 microseconds, the payload portion is transmitted at a bit rate of 100 Mbps, and the heading portion is 3 bytes and is transmitted at a rate of 12 Mbps. That is, for transmission/reception of one PSDU, an overhead of 10 microseconds (8 microseconds for the preamble+2 microseconds for the heading) is produced.

FIG. 8 shows an example of the structure of a beacon signal format. As shown in the figure, in the beacon signal, a preamble for notifying of the presence of the signal is followed by a heading and a payload portion PSDU. In the heading area, information indicating that the packet is a beacon is described. In the PSDU, the following information that wants to be notified of by the beacon is described.

TX. ADDR: Transmitting Station (TX) MAC Address.

TOI: TBTT Offset Indicator (TBTT Offset Indicator)

NBOI: Neighbor Beacon Offset Information (Neighbor Beacon Offset Information)

NBAI: Neighboring Beacon Activity Information (Neighboring Beacon Activity Information)

TIM: Traffic Indication Map (Traffic Indication Map)

PAGE: Paging (Paging)

The TIM is notification information indicating to whom this communication station currently sends information. By referring to the TIM, the receiving station can recognize that the self must receive the information. The paging is a field indicating, of receiving stations described in the TIM, a receiving station that is supposed to perform transmission in the subsequent TGP. A station that is specified in the field must prepare for reception in the TGP. A field for others (ETC field) is also prepared.

The NBOI is information in the beacon placement of neighboring communication stations is described. Since up to 16 beacons can be placed in a superframe period in the present embodiment, the NBOI is configured as a 16-bit length field corresponding to each beacon position and information regarding the placement of beacons received is described in a bitmap format. With reference to the beacon transmission timing of the self station, "1" is written to a bit corresponding to a relative position of beacon reception timing from each communication station and the bit position corresponding to the relative position of timing at which no beacon is received remains "0".

FIG. 9 shows an example of an NBOI description. The example shown in the figure illustrates an NBOI field with which the communication station 0 shown in FIG. 3 indicates that "beacons from communication station 1 to communication station 9 can be received". With respect to a bit corresponding to the relative position of a receivable beacon, when a beacon is received, a mark is assigned, and a beacon is not received, a space is assigned. For another purpose, a mark may be given with respect to a bit corresponding to timing at which no beacon is received.

In the present embodiment, similarly to the NBOI field, a neighboring beacon activity information (NBAI) field is also defined as one piece of information transmitted by the beacon. In the NBAI field, the position (reception time) of a beacon actually received by the self station is described, in a bitmap format, using a relative position from the beacon position of the self station. That is, the NBAI field indicates that the self station is in a receivable state, i.e., active state.

Further, using two types of information, i.e., the NBOI and NBAI, the communication station provides information indicating that the self station receives a beacon at the beacon position in the superframe. That is, using the NBOI and NBAI field contained in the beacon, the self station notifies each communication station about the following two-bit information.

TABLE 1

| NBAI | NBOI | Description |
| --- | --- | --- |
| 0 | 0 | The presence of a beacon is not recognized at the time. |
| 0 | 1 | The presence of a beacon is recognized at the time. |
| 1 | 0 | The station is active at the time. |
| 1 | 1 | The station receives beacons at the time. |

In the present embodiment, each communication station receives a beacon signal from another and can avoid beacon collision based on the description of the NBOI contained in the beacon signal.

FIG. 10 shows a state in which the communication station avoids beacon collision based on the description of the NBOI. The individual rows in the figure represent states in which communication stations STA0 to STA2 join. The left-hand side of each row indicates the topological state of communication stations and the right-hand side indicates the placement of beacons transmitted from the corresponding stations.

The upper row in FIG. 10 shows a case in which only the communication station STA0 exists. In this case, the station STA0 attempts to receive a beacon but cannot receive any beacon. Thus, the station STA0 can set appropriate beacon transmission timing to start transmitting a beacon in response to the arrival of the timing. The beacon is transmitted at an interval of 40 milliseconds. In this case, all the bits in the NBOI field described in the beacon transmitted from the station STA0 are 0s.

The middle row in FIG. 10 shows a state in which the station STA1 enters the communication range of the communication station STA0. The station STA1 attempts to receive a beacon and receives the beacon from the station STA0. Also, all the bits, other than the bit indicating the transmission timing of the self station, in the NBOI field of the beacon from the station STA0 are 0s. Thus, in accordance with step 1 described above, the station STA1 sets its own beacon transmission timing at substantially the center of the beacon interval of the station STA0.

In the NBOI field of the beacon transmitted by the station STA1, "1s" are set at the bit indicating the transmission timing of the self station and the bit indicating the timing of a beacon received from the station STA0 and "0s" are set at all the other bits. Upon recognizing the beacon from the station STA1, the station STA0 also sets "1" at a corresponding bit position in the NBOI field.

The lowermost row in FIG. 10 shows a state in which the communication station STA1 further enters the communication range of the communication station STA02. In the illustrated example, the station STA0 is a hidden terminal for the station STA2. Thus, the station STA2 cannot recognize that the station STA1 receives the beacon from the station STA0. As a result, as shown at the right-hand side, there is a possibility that the station STA2 transmits a beacon at the same timing as the station STA0 and thus collision occurs.

The NBOI field is used to avoid such a hidden-terminal phenomenon. First, in the NBOI field of the beacon from the station STA1, "1" is also set in a bit indicating the timing at which the station STA0 transmits the beacon in addition to the bit indicating the transmission timing of the self station. Thus, although the station STA2 is not able to directly receive the beacon transmitted from the station STA0, the station STA2 recognizes the timing at which the station STA0 transmits the beacon and avoids the beacon transmission at the recognized timing. Then, as shown in FIG. 11, the station STA2 specifies the beacon transmission timing at substantially the center of the beacon interval of the stations STA0 and STA1. Naturally, in the NBOI in the beacon transmitted by the station STA2, bits indicating the beacon transmission timings of the stations STA2 and STA1 are set to "1s".

The beacon collision avoidance function based on the description of the NBOI field, as described above, can avoid beacon collision by keeping a track of the beacon position of a hidden terminal, i.e., a neighboring station that is two hops away. In some cases, however, beacon collision cannot be avoided. Such a situation will now be described with reference to FIGS. 12 to 14.

FIGS. 12 and 13 show states in which a network with network ID 0 and a network with network ID 1 are constructed, respectively. In the illustrated examples, although up to 64 beacons can be placed at an interval of 625 microseconds in a superframe period, the placement of up to 32 beacons is permitted considering the minimum beacon interval $B_{min}$ and backoff. Beacon positions in the network ID 0 are indicated by 0 to 31 and beacon positions in the network ID 1 are indicated by 32 to 63. In each network, beacons are sequentially positioned until the number thereof reaches 32, in accordance with the algorithm in which the beacon transmission timing of a newly joining station is sequentially set at substantially the center timing of a beacon interval set by existing communication stations. Suppose that the networks with networks ID 0 and ID 1 perform synchronization at different timings from each other.

It is now assumed that systems that construct the network with network ID 0 shown in FIG. 12 and the network with network ID 1 shown in FIG. 13 approach each other. In this case, an environment in which the networks exist in a range in which a shied, such a wall and/or a door, prevents respective radio waves from reaching. In this environment, when the door opens to clear the shield, the systems approach each other. Such a case will hereinafter be referred to as a "crossover state".

In the wireless network according to the present embodiment, each communication state manages a neighboring-station list (a neighbor list) for managing communication stations in the neighbor, based on the reception timings of beacons and the contents described in the NBOI fields in the beacons. FIG. 15 shows the structures of neighboring-station lists managed by respective networks with network ID 0 and network ID 1.

The networks with network ID 0 and network ID 1 perform synchronization at different timings from each other. Now suppose that the networks with network ID 0 and network ID 1 are 625 microseconds out of synchronization relative to each other. In this case, when a crossover state as shown in FIG. 14 occurs, the neighboring-station list needs to manage network ID 0 and network ID 1, which are separately constructed, as one network.

FIG. 16 shows an example of the configuration of the neighboring-station list when the state in which the systems are separately managed as shown in FIGS. 12 and 13 is changed to a state in which they are handled as one network. FIG. 17 schematically shows beacon positions during the change. In FIG. 16, the neighboring-station list shown in the upper section (i.e., the neighbor list for network ID 0) in FIG. 15 is a neighboring-station list managed by the communication stations STA0 to STA31 shown in FIG. 12 and the neighboring-station list shown in the lower section (i.e., the neighbor list for network ID 1) in FIG. 15 is a neighboring-station list managed by the communication stations STA32 to STA63 shown in FIG. 13. The neighboring-station list shown in FIG. 16 is a neighboring-station list when no shield exists between the systems.

Since it is supposed that network ID 0 and network ID 1 are 625 microseconds out of synchronization relative to each other in the crossover state shown in FIG. 14, the beacons thereof are alternatively and equally placed on a time axis, so that communication can be performed without abnormality processing. Since the system according to the present embodiment limits the number of neighboring stations to up to 64, a maximum number of beacons can be managed and thus the beacon collision between systems can be avoided.

Next, a case in which beacon collision cannot be avoided will be described. Now suppose a case in which the relative displacement of network ID 0 and network ID 1 is zero microsecond in FIGS. 12 and 13. In this situation, when the crossover state occurs, the NBOI notifies the neighboring stations, as NBOI information, about the state in which a shield exists, and thus an immediate action cannot be taken when the shied is cleared. The communication station performs a full-scan operation for receiving all beacons from neighboring stations at regular time intervals, but cannot avoid beacon collision while being left in the crossover state, until performing the full-scan operation. In order to avoid the state, this system has two functions, namely, a TBTT offset indicator function and a beacon-transmission-timing change request function. These functions will be described below.

TBTT Offset Indicator

In step 1 described above, the beacon transmission timing is specified to have an interval of 40 milliseconds. The beacon transmission time specified to be the interval of 40 milliseconds is defined as TBTT (target beacon transmit time). In the present invention, in order to prevent sequential beacon collisions in the crossover state shown in FIG. 14, actual beacon transmission timings are intentionally offset from the TBTT to avoid collision, for each network system rather than for each beacon.

For example, as shown in FIG. 18, a total of seven beacon transmission timings, for example, TBTT, TBTT+20 microseconds, TBTT+40 microseconds, TBTT+60 microseconds, TBTT+80 microseconds, TBTT+100 microseconds, and TBTT+120 microseconds, are defined by offsetting the actual beacon transmission timings at an interval of 20 microseconds. Prior to the beacon transmissions, how much the beacons are offset from the TBTT is randomly selected for the transmissions in this case and the actual beacon transmission times are determined. In this case, although different TBTTs are defined at an interval of 20 microseconds, the interval does not have to be 20 microseconds and thus the interval may be defined to be smaller or larger. The portion that is actual beacon transmission timing intentionally offset from the TBTT, as described above, is called a TBTT offset.

Beacon Transmission Timing Change Request

In the crossover state, even when the TBTT offset indicator can avoid the event that the beacons of all the 32 stations collide with each other, but beacons can collide once out of several times. Thus, the problem still remains.

Accordingly, upon recognizing that the TBTTs of multiple communication stations are set at substantially the same time, each communication station issues a message requesting a change in the TBTT to any of the beacon transmitting stations, i.e., executes a sequence for a request for changing the beacon transmission timing.

Upon receiving the request for a change in the TBTT, the communication station scans beacons from the neighboring stations. The communication station then finds time at which the self station does not receive any beacon and the NBOI of a received beacon does not indicate "1", and sets the time to be new TBTT (new TBTT). After setting the new TBTT, the communication station posts a message indicating "Since a new beacon is set, the TBTT will be changed in xx milliseconds from now." on a beacon transmitted at the current TBTT, before actually changing the TBTT. Thereafter, the communication station changes the TBTT.

When transmitting such a beacon-transmission-timing change request, the communication station uses the neighboring-station list shown in FIG. 16 to determine whether or not beacons are colliding with each other. Reference is made to the neighboring-station list to manage the network; however, referring to all entries in the list, each time the change request is issued, is inefficient and also requires a search time. As shown in FIG. 16, entries are arranged in the neighboring-station list in a sequence equivalent to the time axis and counter information for measurement of beacon intervals is included in the list in order to determine whether or not collision is occurring. Placing beacons in accordance with the neighboring-station-list sequence can reduce the search time during beacon transmission/reception and can reduce the amount of time for processing for detecting beacon collision.

Naturally, the communication may find time at which no beacon is placed in a frame period to set its own beacon transmission timing again, when a station that overlaps beacon reception timing managed in the neighboring-station list managed by the self, rather than changing the beacon position in response to the beacon-transmission-timing change request from another station. In such a case, since communication stations in the neighbor do not know that the beacon position has changed, a message indicating the change in the beacon position is transmitted. Further, the change message may be broadcast in an environment in which all communication stations operate based on the same algorithm. For example, when the relative time of two beacons is one half (312.5 microseconds) of the TBTT, the use of an algorithm that causes a communication station having an early (or late) beacon transmission timing to continue the beacon transmission at the transmission timing without a change can eliminate a need for immediately transmitting the change message. This is because all the communication stations recognize that the beacon transmission timing is automatically adjusted based on the algorithm. The information indicating the change in the beacon transmission position may be notified via a change in the mapping state of the NBOI or NBAI contained in the beacon information.

The first embodiment of the present invention is equally applicable to a case in which multiple frequency channels exist as transmission media. Although the description has been given of the case in which the length of the preamble is 8 microseconds and the bit rate of the payload portion is 100 Mbps for the specific description, the numeric values may be different therefrom. Further, although the CSMA has been used for the basic access procedure, various access systems, including the TDMA, may be used for the structure of the neighboring-station list. With another access system, clearing the medium before transmission may be unnecessary.

The description in the first embodiment of the present invention has been given of a case in which the relative displacement in synchronization timing between network ID 0 and network ID 1 is 0 microsecond and a case in which the relative displacement is 625 microseconds. Naturally, the substance of the present invention is not limited to such a specific embodiment. The network ID is a name intended for one group, and may be, for example, a segmentation using an Ethernet (registered trademark) IP address or a BSS or IBSS according to IEEE 802.11 or the like.

In the first embodiment of the present invention, although the counter information for measurement of beacon intervals is included in the neighboring-station list, the counter information may be eliminated therefrom. When receiving a beacon within 625 microseconds after the beacon transmission/reception timing of a neighboring station of the self station, it is also possible to query the transmitting end of the received beacon as a new joining neighboring station, by way of a message.

Although the description in the first embodiment of the present invention has been given based on the premise that the stations from which beacons have been received are included in the neighboring-station list, the substance of the present invention is not limited thereto. For example, since beacon placement information such as NBOI allows the presence of a beacon to be recognized without reception of the beacon, the neighboring station can also perform operation, assuming that the beacon is received on the neighboring-station list.

SECOND EMBODIMENT

In a network in which a coordinator is not required, the neighboring-station list is considered to be a network-control core that controls the synchronization with each communication station to enable data communication between communication stations. Correspondingly, hardware (or a communication-protocol lower layer) or software (or a communication-protocol higher layer) is required to execute complicated control, such as transmission/reception scheduling, via the neighboring-station list. Thus, for incorporation into each communication station, it s desired that the neighboring-station list has a structure that allows for more simplified control.

The structure of the neighboring-station list that allows the hardware and/or software to achieve more simplified control will be described in the present embodiment. In the present embodiment, a system in which the beacon transmission timing of the self station is 40 microseconds and the minimum interval $B_{min}$ of beacons received from other communication stations is 625 microseconds is considered. In this case, the beacons of up to 64 communication stations(=40/0.625) can be configured to provide a network including the self station. Thus, a neighboring-station list for a system having a maximum number of 64 stations will be described below.

FIG. 19 shows the structure of a neighboring-station list in the present embodiment. In the figure, the index (index) is given numbers (serial numbers) 0 to 63 corresponding to a time axis and a total of 64-row information area entries can be written or read.

Information, i.e., an address, network ID, NBOI, NBAI, and authentication, which are exchanged between the hardware and the software is described in corresponding information areas. In the NBAI (neighboring beacon activity information) field, the position (reception time) of a beacon actually received by the self station is described, in a bitmap format, using a relative position from the beacon position of the self station (as described above).

In the example shown in FIG. 19, in the first-row information area entry (index 0), a beacon transmitted/received to/from only one station in a 625 microseconds(=40 milliseconds/64 nodes), which is the minimum beacon interval $B_{min}$, is described. That is, the reason why the restriction is imposed such that only one row of the information area entries can be used for every 625 microseconds is that fixing the structure so that the time axis corresponds to the number of rows of the information area entries can ensure the operation of the hardware and software writing schedule.

A description is further given in conjunction with the example of index 0. The beacon transmission information of the self station is included in index 0. Each communication station sets the TBTT timing at which the self station transmits its beacon to "0". When information regarding a beacon in the period of 0 microsecond to less than 625 microseconds is described for only station, each communication station transmits its own beacon before receiving a beacon from another station. Thus, reception information from another communication station is not included in the information area entries in the period of 0 microsecond to less than 625 microseconds.

However, it is also possible to assume a case in which a beacon from another station is received in the period of 0 microsecond to less than 625 microseconds, i.e., a case in which beacons are crossed over. Examples include a case in which a shield that has shielded the systems is suddenly removed and a crossover state as shown in FIG. 14 occurs. Accordingly, the neighboring-station list has a separate area prepared to describe beacon information redundantly transmitted to (received at) the same beacon position in the period of 0 microsecond to less than 625 microseconds The lower-section table shown in FIG. 19 corresponds to the description area and is herein referred to as a "save area (temporary neighboring list)".

Similarly, with regard to index 1, when there are two or more other stations from which beacons are received in the period of 625 microseconds to less than 1250 microseconds, one of them is included in ordinarily area index 1 of the neighboring-station list and the others are included in the save area. The communication station that has received two or more beacons transmits the beacon-transmission-timing change request message (described above), using the save area, to the communication stations included in the save area, until the communication stations are relocated to indices 0 to 63, which are ordinary areas of the neighboring-station lists. Alternatively, each communication station described in the save area shifts its own beacon transmission timing in accordance with the predetermined algorithm to perform setting again (as described above). In the latter case, the communication station waits until the communication station written in the neighboring-station save list is relocated to the neighboring-station list.

During normal operation, the software reads the neighboring-station list at predetermined timing. However, in a crossover state as shown in FIG. 14, when all 32 beacons collide with each other, the stations STA0 to STA31 are written to the ordinary area in the neighboring-station list and the stations STA32 to STA63 are written to the save area. In this case, since the save area becomes full in 3.125 milliseconds(=625 microseconds×5), the hardware needs to notify the software by interruption such that the software sends a message, before the save area becomes full. Between two networks, it is possible to perform adjustment as to which timing of the beacons should be should adopted, while transmitting messages. Also, it is also possible for a third-party communication station to send a message for notifying the two communications stations that are colliding with each other.

In such a case, the hardware writes beacon-reception data to the save area to thereby notify the software about the beacon collision. Thereafter, the software prepares to transmit the beacon-transmission-timing change request message and performs message processing for the message via the hardware.

In the present embodiment, a system in which the beacon transmission timing interval of the self station is 40 milliseconds and the minimum interval $B_{min}$ of beacons received from other stations is 625 microseconds has been considered. The substance of the present invention, however, is not limited to those numeric values and is equally applicable to other numeric values.

Further, although indices 64 to 68 for only five stations are prepared in the save area in FIG. 19, the present invention is not limited thereto. In the case of the system for 64 stations, in the worst case, no deviation in synchronization may exist between the networks in a crossover state between network ID 0 and network ID 1 shown in FIG. 14. In this case, beacons of all 32 stations collide with each other. Thus, in order to avoid the collision of beacons of 32 stations, preparing a save area having information area entries for the 32 stations allows for instantaneous handling. This save area can be appropriately implemented considering the probability of occurrence and the capacity of the hardware.

Although the embodiment in which one communication station performs transmission/reception in 625 microseconds has been illustrated in the example shown in FIG. 19, the number thereof is not limited to one. When a memory is available, information for any number of communication stations may be written thereto.

THIRD EMBODIMENT

In the present embodiment, in a network in which no coordinator is required, a system in which the beacon transmission timing of the self station is 40 microseconds and the minimum interval $B_{min}$ of beacons received from other communication stations is 625 microseconds is considered, as in the second embodiment. In this case, the beacons of 64 stations(=40/0.625) can be incorporated to configure a network including the self station. A neighboring-station list for a system having a maximum number of 64 stations will be described below. The present embodiment can further ensure the operation of scheduling for reading/writing performed by the hardware (or a communication-protocol lower layer that writes a newly obtained beacon in the save area) and the software (or a communication-protocol upper layer that relocates the beacon in the save area to the ordinary area).

FIG. 20 shows the structure of a neighboring-station list in the present embodiment. In the example shown in the figure, two sides are prepared for a neighboring-station list. One is a side (hereinafter tentatively referred to as "side A") that is written by the hardware (or the communication-protocol lower layer that writes newly obtained beacon reception timing) and read by the software (or the communication-protocol upper layer). The other is a side (hereinafter tentatively referred to as a "side B") that is written by the software and is read by the hardware.

Side B has the same structure as that shown in FIG. 19 and information area entries (indices) correspond to the time axis. As in FIG. 19, when beacons are likely to collide with each other, one communication station that has received the beacon is written to an information area entry in the save area until an operation, such as changing the beacon transmission timing, causes the communication station to be written to the neighboring-station list. On the other hand, side A has 64-row information area entries prepared to allow the reception of beacons of up to 63 stations that can be placed in the superframe period.

FIG. 21 shows a state in which the hardware and the software access side A and side B of the neighboring-station list. The software that manages the network accesses the neighboring-station list of side B. When the neighboring-station list of side B has available space, the software determines that beacon placement is possible and writes a beacon to the neighboring-station list. On the other hand, when the neighboring-station list of side B has no available space, the software determines that beacon placement is impossible and writes a beacon to the save area. Information written in the neighboring-station list and the save area is then passed to the hardware. FIG. 22 shows, in a flow chart form, the operation of the hardware for accessing the neighboring-station list and FIG. 23 shows, in a flow chart form, the operation of the software for accessing the neighboring-station list.

In FIG. 22, upon receiving a beacon (step S101), the hardware compares an index counter value in the neighboring-station list with a frame counter (a counter that is responsible for a frame using the beacon interval of the self station as a frame (superframe)) provided in the hardware (step S102). The hardware then determines whether or not the beacon information that has just received is already included in the neighboring-station list (step S103).

When the beacon information that has just received is already included in the neighboring-station list, the hardware notifies the network-managing access controller (software) about only the reception of the beacon (step S104) and ends the processing.

On the other hand, when the beacon information that has just received is not written in the neighboring-station list yet, the address, network ID, NBOI, and NBAI information regarding the received beacon are written to the available information area entries of side A (step S105).

Further, in FIG. 23, the software that manages the network inspects the information area entries of side A (step S201) and confirms whether or not a new communication station has joined (step S203).

Next, the software compares B-side copy information that is internally held with the reception time of the communication station that has joined newly (step S204). The software then determines whether or not it is necessary to change the transmission timing of the received beacon (step S205).

When there is a need to change the beacon transmission timing, the software transmits the beacon-transmission-timing change request message (step S206). When there is no need for the change, the software performs authentication (authentication) processing to determine whether or not that communication station is a communication in the network including the self station (S207)

As described above, the provision of the hardware and software mechanism that prevents the collision of writing timings provides a configuration that can ensure the management of the neighboring-station list. In the case of the system for 64 stations, in the worst case, the systems with network ID 0 and network ID 1 shown in FIGS. 12 and 13 may be left in a crossover state in which no deviation in synchronization exists between the networks. In such a case, the system falls into such a crossover state in which all the beacons of 32 stations collide with each other, thus increasing the load for managing the network. As shown in FIG. 21, the present embodiment provides a configuration that can ensure the management of the neighboring-station list, thereby allowing for the operation without causing failure.

The substance of the present invention is not limited to the above described embodiment. In the present embodiment, a system in which the beacon transmission timing interval of the self station is 40 milliseconds and the minimum interval $B_{min}$ of beacons received from other stations is 625 microseconds has been considered. The present invention, however, is not limited to those numeric values and, naturally, is applicable to other numeric values.

Further, although indices 64 to 68 for only five stations are prepared as information area entries in the save area in the present embodiment, the present invention is not limited thereto. In the case of the system for 64 stations, in the worst case, the systems with network ID 0 and network ID 1 shown in FIGS. 12 and 13 may be left in a crossover state in which the synchronization is not deviated between the networks. In this case, all the beacons of 32 stations collide with each other. Thus, when a save area for the 32 stations is provided, it is possible to promptly taken an action for collision avoidance. This save area can be appropriately implemented considering the probability of occurrence and the capacity of the hardware.

Additionally, although the beacon-transmission-timing change request message is transmitted in step S206, the arrangement may be such that the own beacon transmission timing is set again and a message notifying of the change in the beacon position is transmitted, instead of transmitting the beacon-transmission-timing change request message.

Between two networks, it is also possible to perform adjustment as to which timing of the beacons should be adopted, while transmitting messages. Also, it is also possible for a third-party communication station to send a message for notifying the two communications stations that are colliding with each other.

Supplement

The present invention has been described above in detail with reference to the particular embodiments. However, it is obvious to those skilled in the art that a modification and substitution can be made to the embodiments without departing from the substance of the present invention. That is, the present invention has been disclosed by way of example and should not be construed as limiting. The scope of the invention is to be determined by taking the claims into consideration.

INDUSTRIAL APPLICABILITY

In a communication environment in which a plurality of ad-hoc networks are adjacent to each other, the present invention can provide a superior wireless communication system, a wireless communication apparatus, a wireless communication method, and a computer program which can preferably form an appropriate wireless network without communication terminals interfering with each other across the networks.

In a communication environment in which a plurality of ad-hoc networks are adjacent to each other, the present invention can provide a superior wireless communication system, a wireless communication apparatus, a wireless communication method, and a computer program which can preferably form a wireless network with a low-load network management configuration.

According to the present invention, in a wireless communication system in which a system timer and a master station that controls common frame time do not exist in a domain included in the system, each communication station, at least, periodically transmits/receives a beacon at regular time intervals and manages the transmission/reception using a neighboring-station list (a neighbor list). This makes it possible to manage the network of the communications station in a distributed manner. In addition, a mechanism for managing n beacons (n is an integer greater than or equal to one) transmitted/received at regular time intervals, using a neighboring-station list, is provided and a save area for receiving a number of beacons which is greater than n at the regular time intervals is provided. As a result, there is an advantage in that hardware (during reception of a new beacon) and the software (during update of the list) can easily schedule the list reading/writing processing to thereby prevent occurrence of a failure in the neighboring-station list. Further, this arrangement makes it possible to perform operation without a failure, even when a high-load situation for managing the network, such as a situation in which network topologies are crossed over, arises.

BRIEF DESCRIPTION OF THE DRAWINGS

FIG. 1 is a block diagram schematically showing the functional configuration of a wireless communication apparatus that is capable of operating as a communication station in a wireless network according to the present invention.
FIG. 2 illustrates beacon transmission procedure at each communication station.
FIG. 3 shows one example of beacon transmission timing.
FIG. 4 shows the specification of a packet interval.
FIG. 5 shows a state in which transmission priority is given to a station that has transmitted a beacon.
FIG. 6 shows a transmission priority period and a contention transmission period in a superframe period.
FIG. 7 shows an example of the structure of a packet format.
FIG. 8 shows an example of the structure of a beacon signal format.
FIG. 9 shows an example of an NBOI description.
FIG. 10 illustrates a scheme for avoiding beacon collision using the NBOI.
FIG. 11 shows a state in which the beacon transmission timing of a newly joining communication station STA2 is specified to be at substantially the center of the beacon interval of communication stations STA0 and STA1.
FIG. 12 illustrates a case in which beacon collision cannot be avoided.

FIG. 13 illustrates a case in which beacon collision cannot be avoided.

FIG. 14 illustrates a case in which beacon collision cannot be avoided.

[FIG. 15]

FIG. 15 shows the structures of neighboring-station lists managed by respective communication stations in networks with network ID 0 and network ID 1.

[FIG. 16]

FIG. 16 shows the structure of a neighboring-station list that manages network ID 0 and network ID 1 just like one network.

FIG. 17 schematically shows beacon positions when the networks with network ID 0 and network ID 1 are crossed over.

FIG. 18 shows a state in which multiple beacon transmission times are defined.

[FIG. 19]

FIG. 19 shows the structure of a neighboring-station list according to a second embodiment of the present invention.

[FIG. 20]

FIG. 20 shows the structure of a neighboring-station list according to a third embodiment of the present invention.

FIG. 21 shows a state in which the hardware and the software access side A and side B of the neighboring-station list.

FIG. 22 is a flow chart showing the operation of hardware for accessing the neighboring-station list.

FIG. 23 is a flow chart showing the operation of software for accessing the neighboring-station list.

FIG. 24 illustrates an IEEE 802.11 wireless networking operation in infrastructure mode.

FIG. 25 illustrates an IEEE 802.11 wireless networking operation in ad-hoc mode.

FIG. 26 illustrates the IEEE 802.11 wireless networking operation in ad-hoc mode.

FIG. 27 illustrates a problem in the wireless networking.

FIG. 28 illustrates a problem in the wireless networking.

REFERENCE NUMERALS

Figure 1:
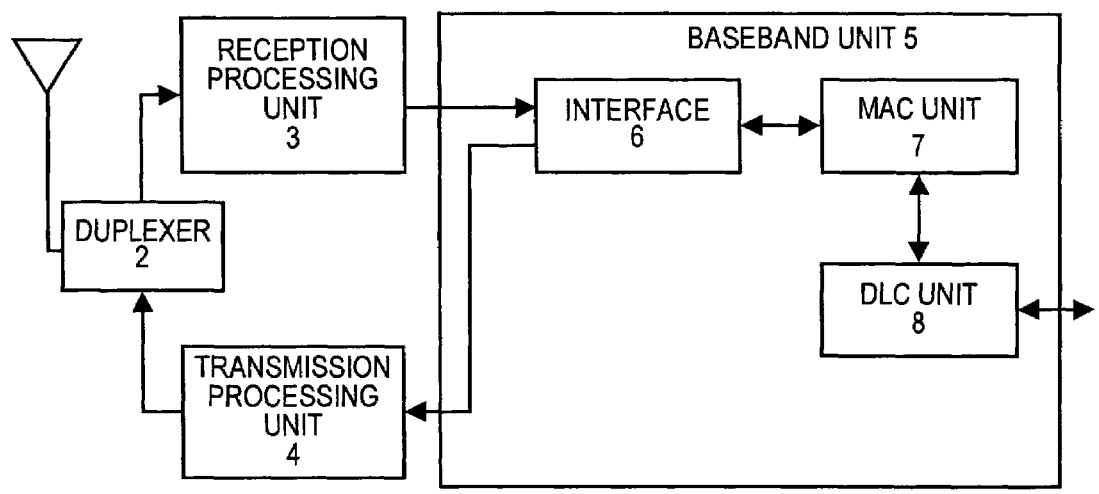
[FIG. 1]
Figure 2:
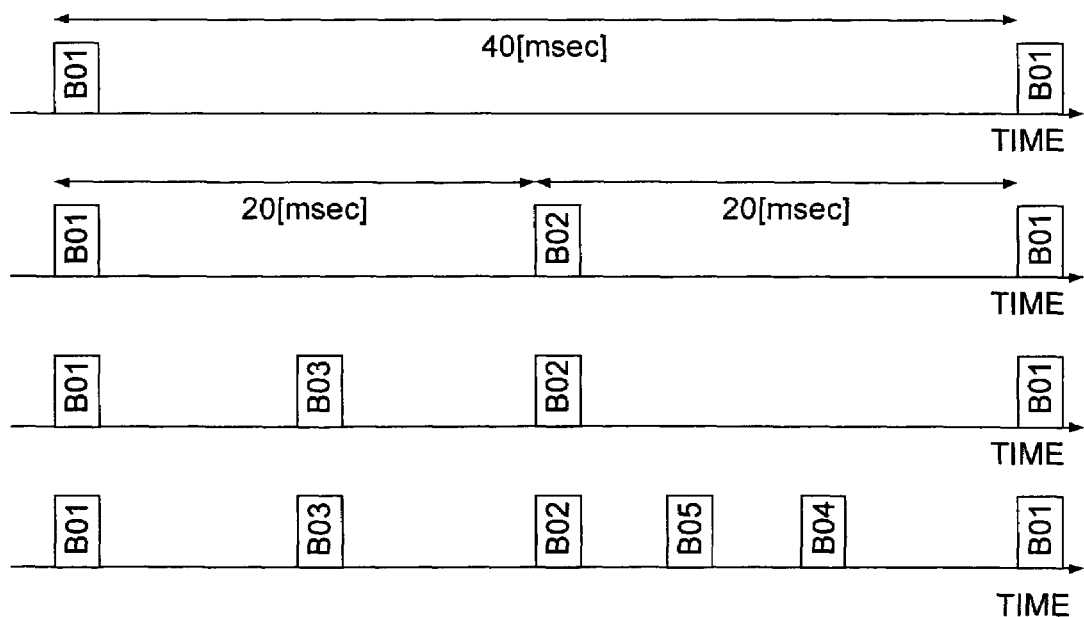
[FIG. 2]
Figure 3:
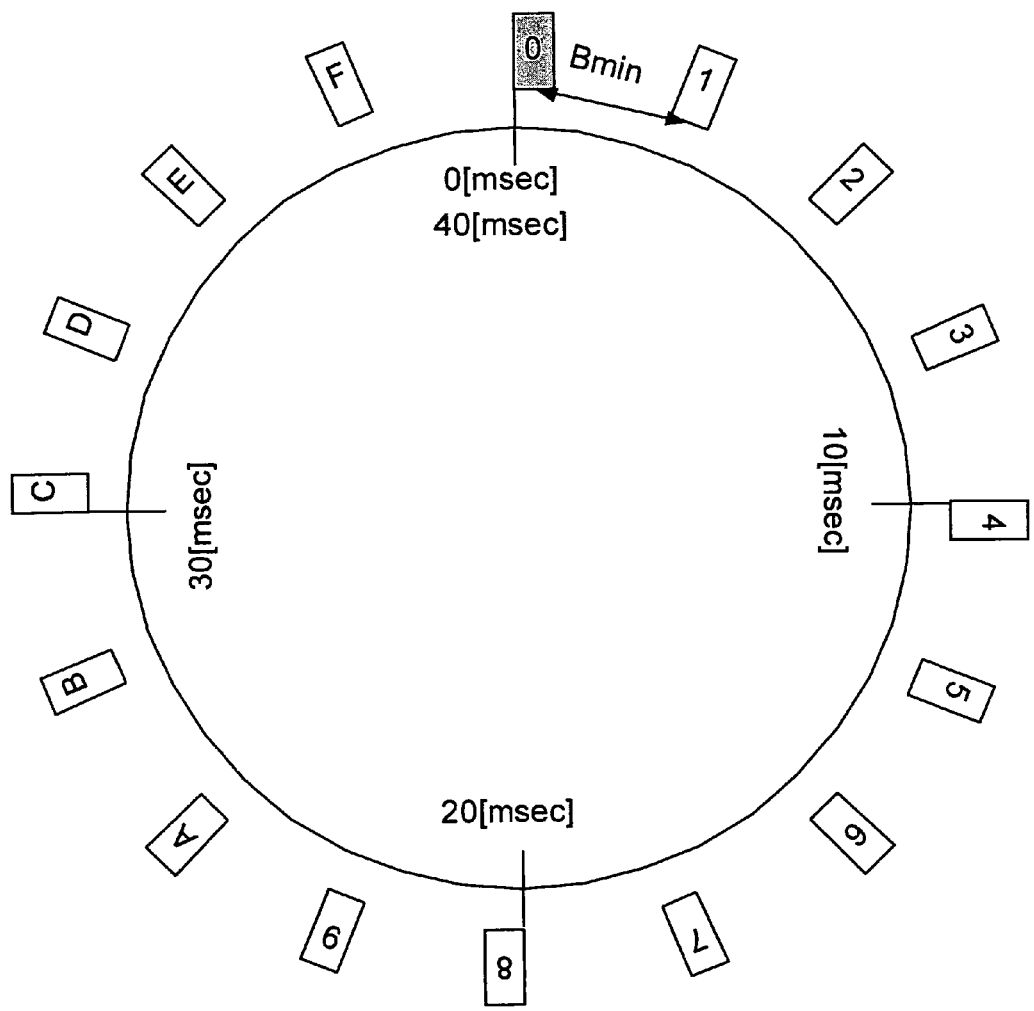
[FIG. 3]
Figure 4:
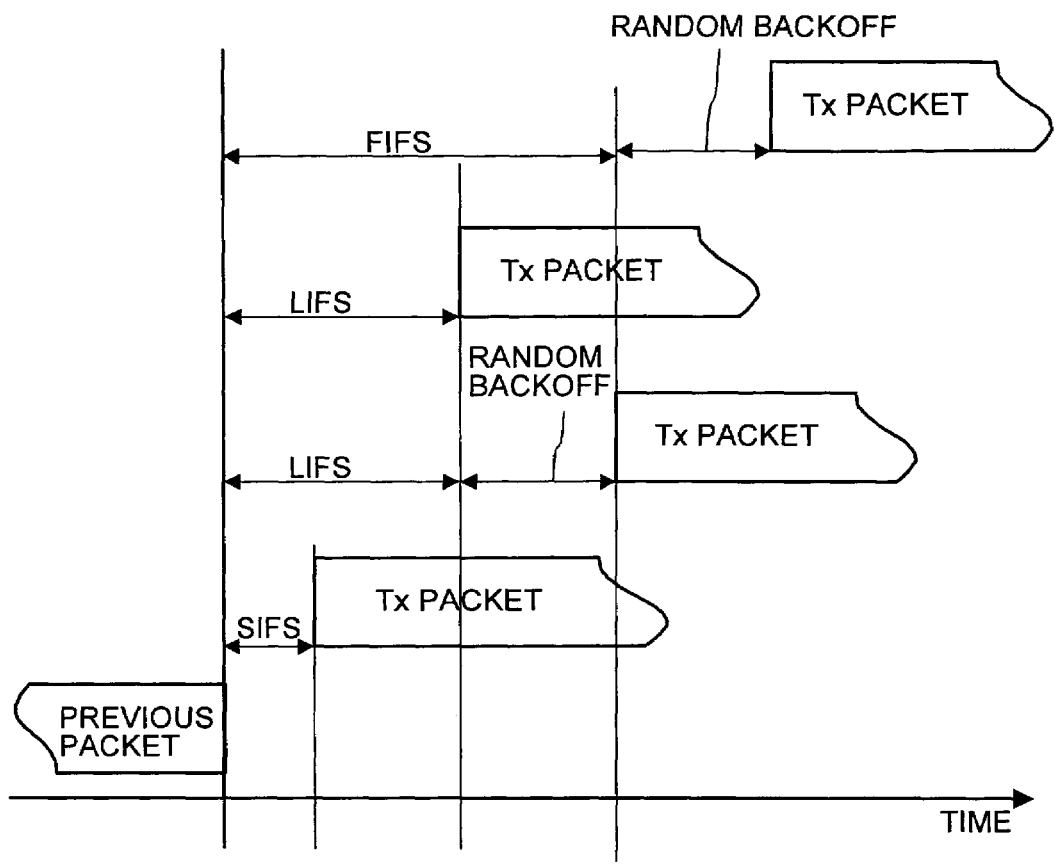
[FIG. 4]
Figure 5:
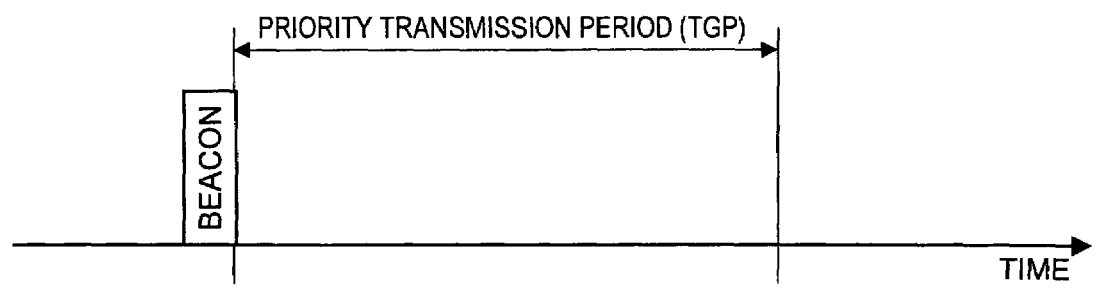
[FIG. 5]
Figure 6:
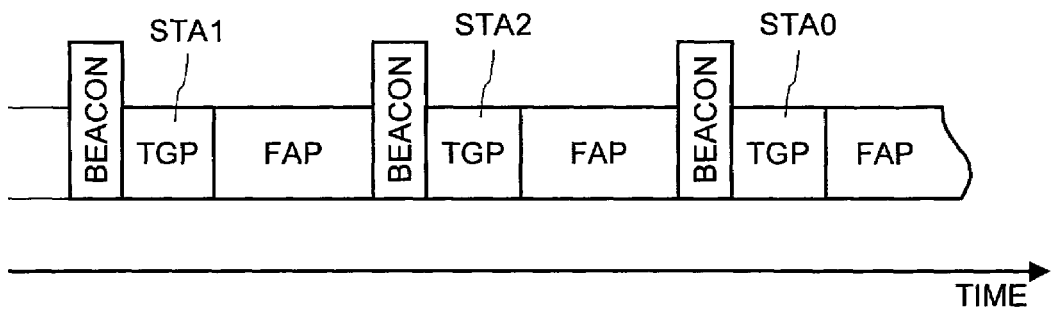
[FIG. 6]
Figure 7:
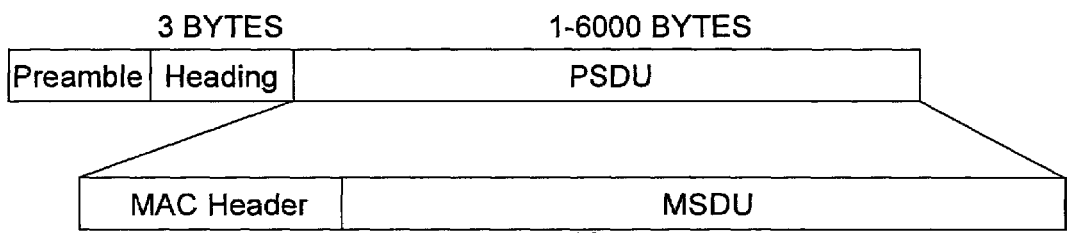
[FIG. 7]
Figure 8:
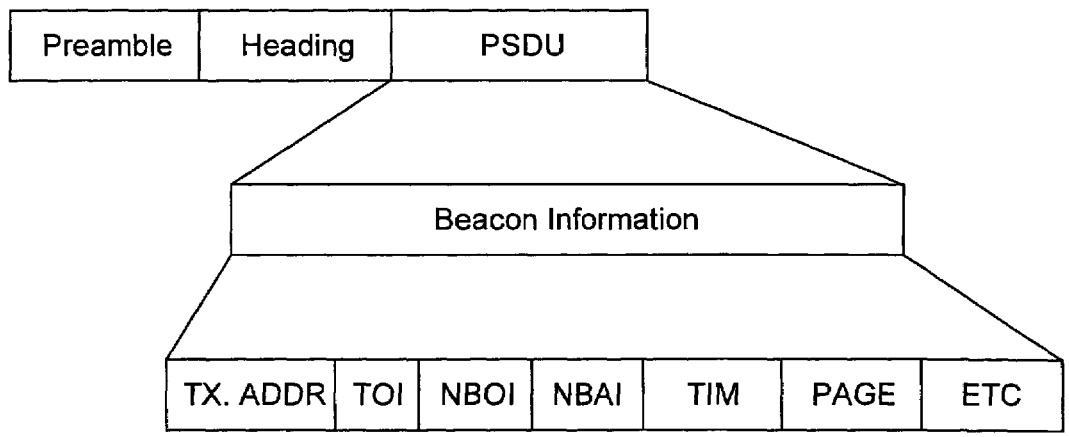
[FIG. 8]
Figure 9:
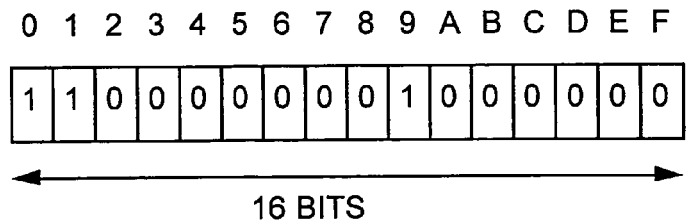
[FIG. 9]
Figure 10:
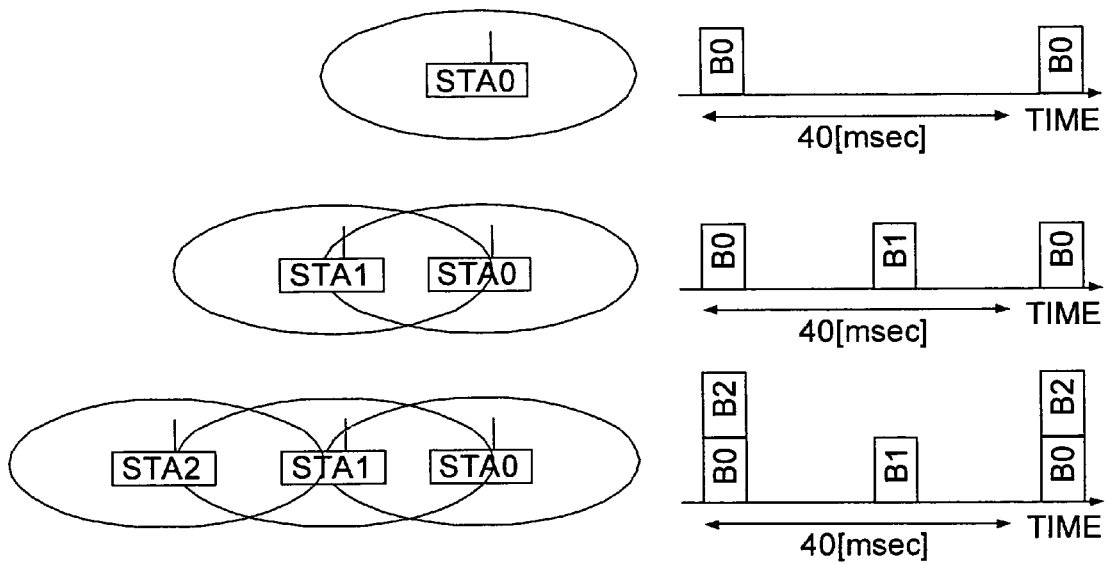
[FIG. 10]
Figure 11:
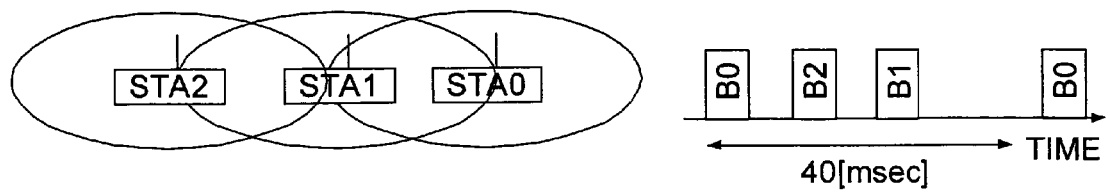
[FIG. 11]
Figure 12:
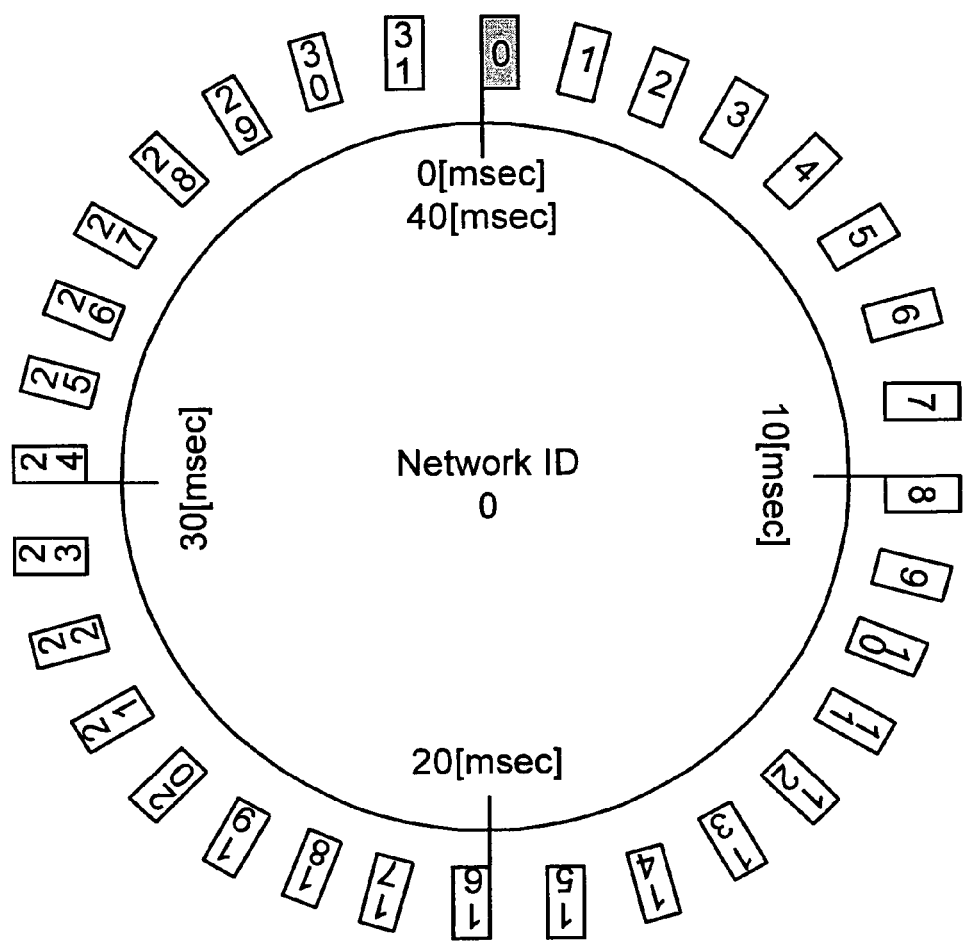
[FIG. 12]
Figure 13:
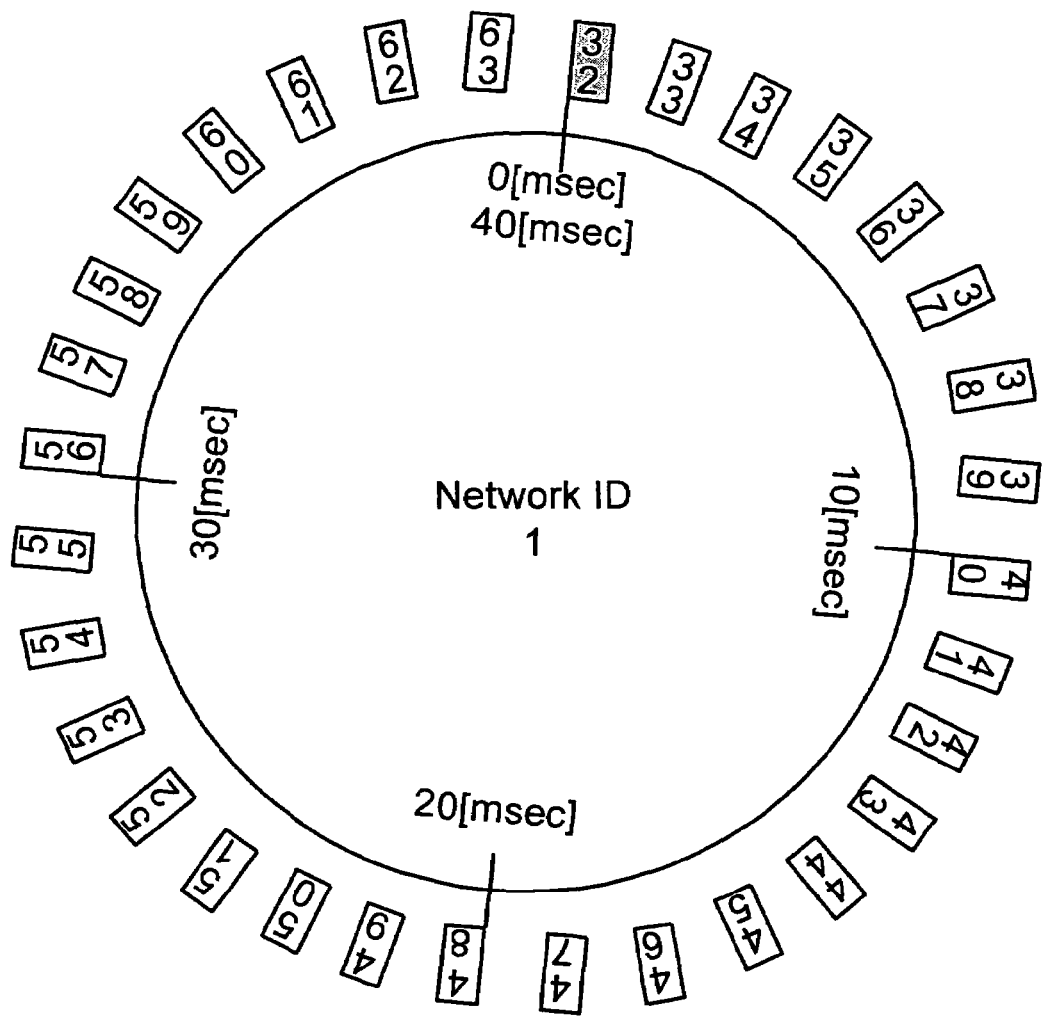
[FIG. 13]
Figure 14:
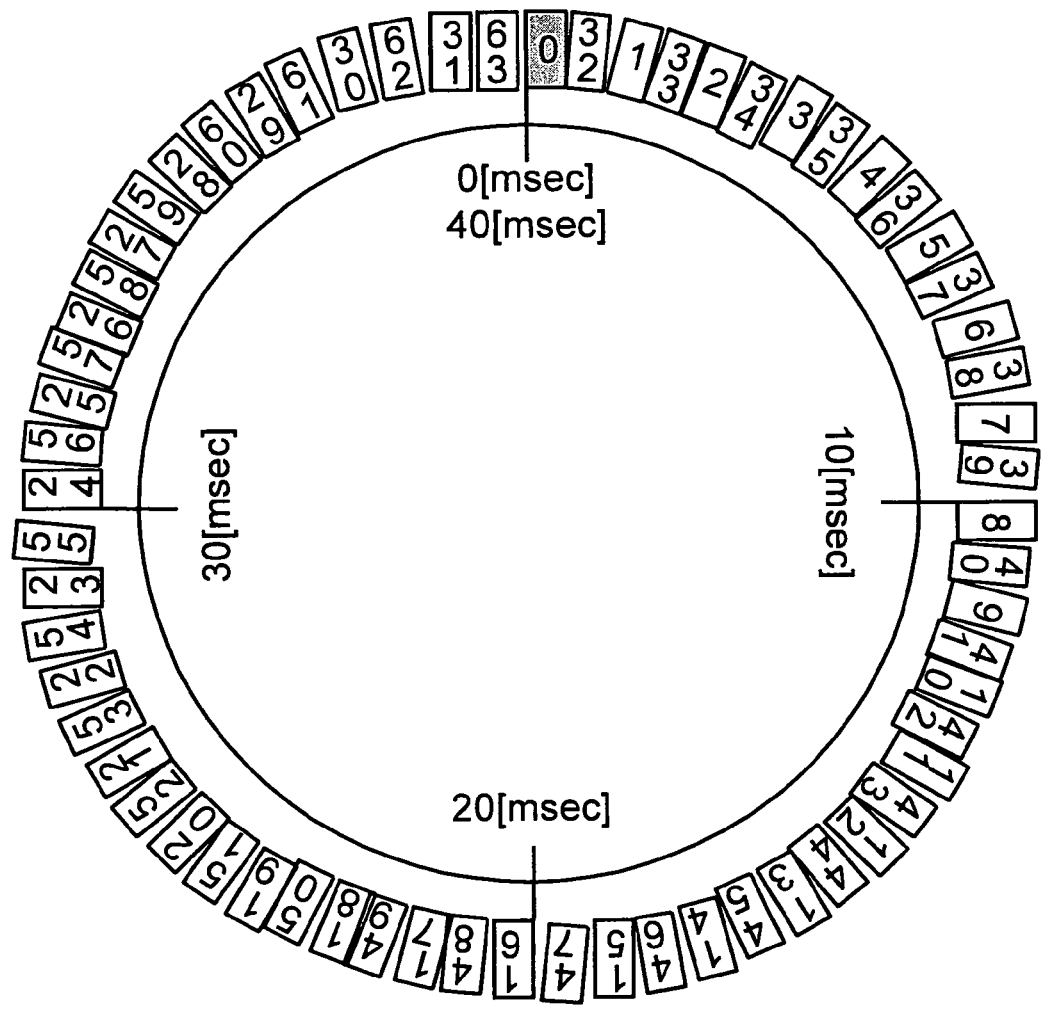
[FIG. 14]
Figure 17:
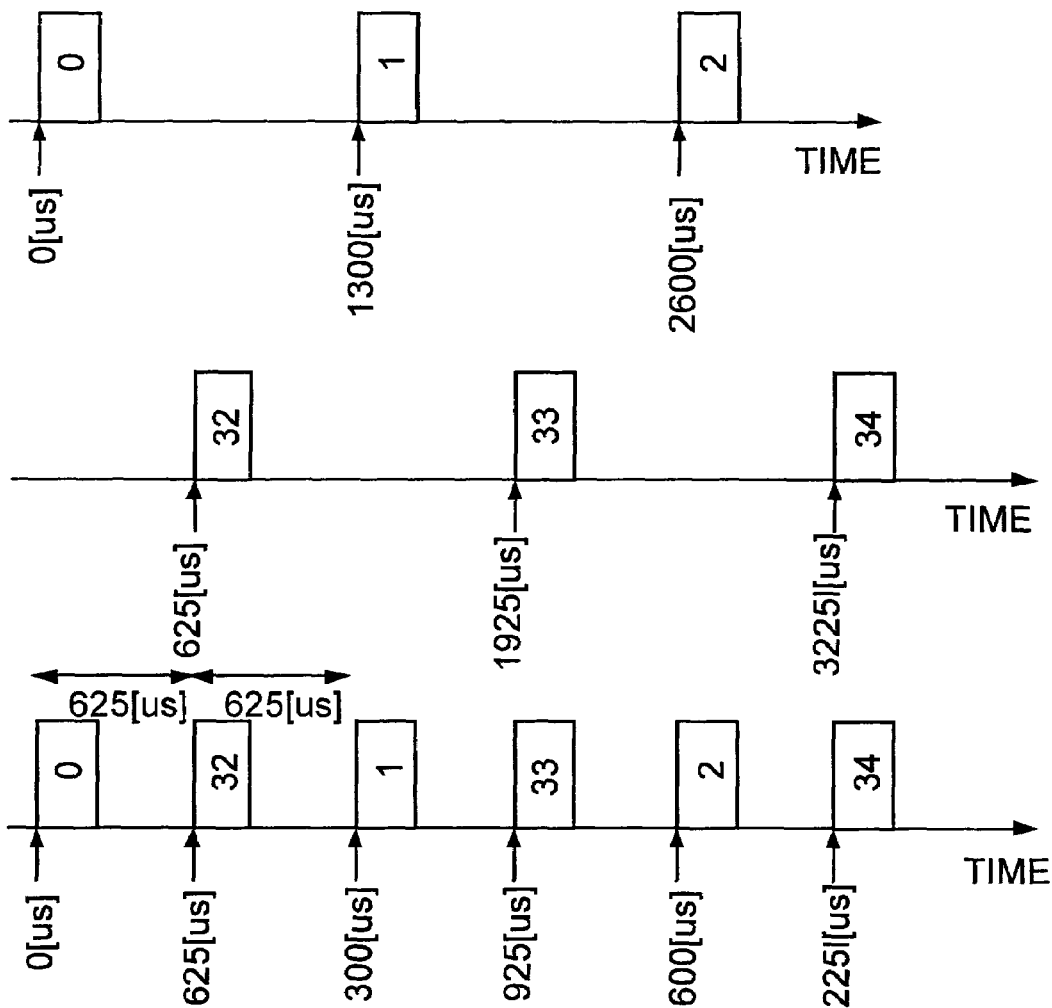
[FIG. 17]
Figure 18:
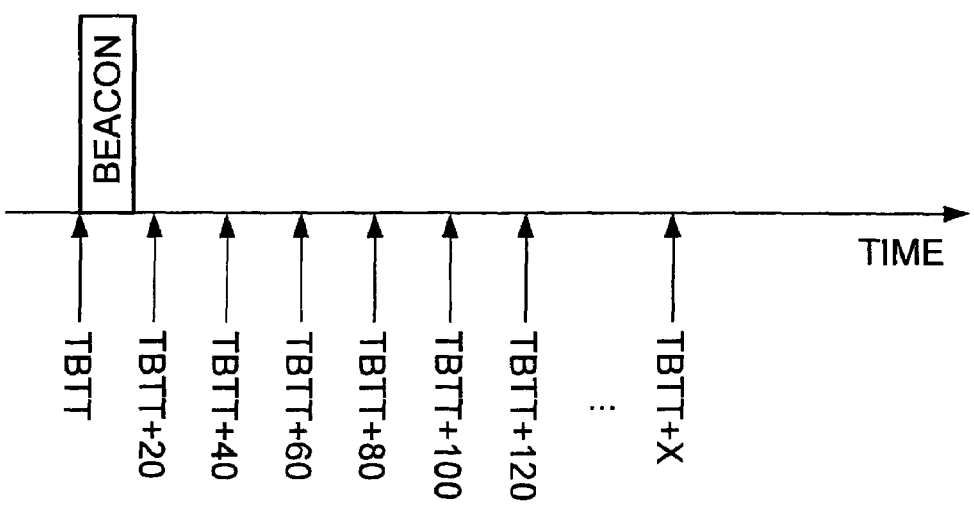
[FIG. 18]
Figure 21:
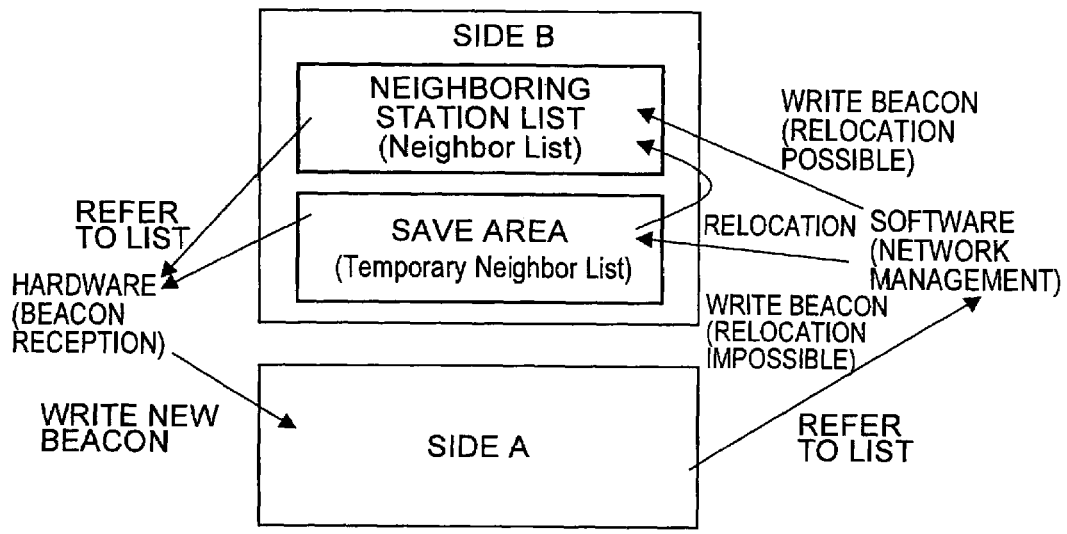
[FIG. 21]
Figure 22:
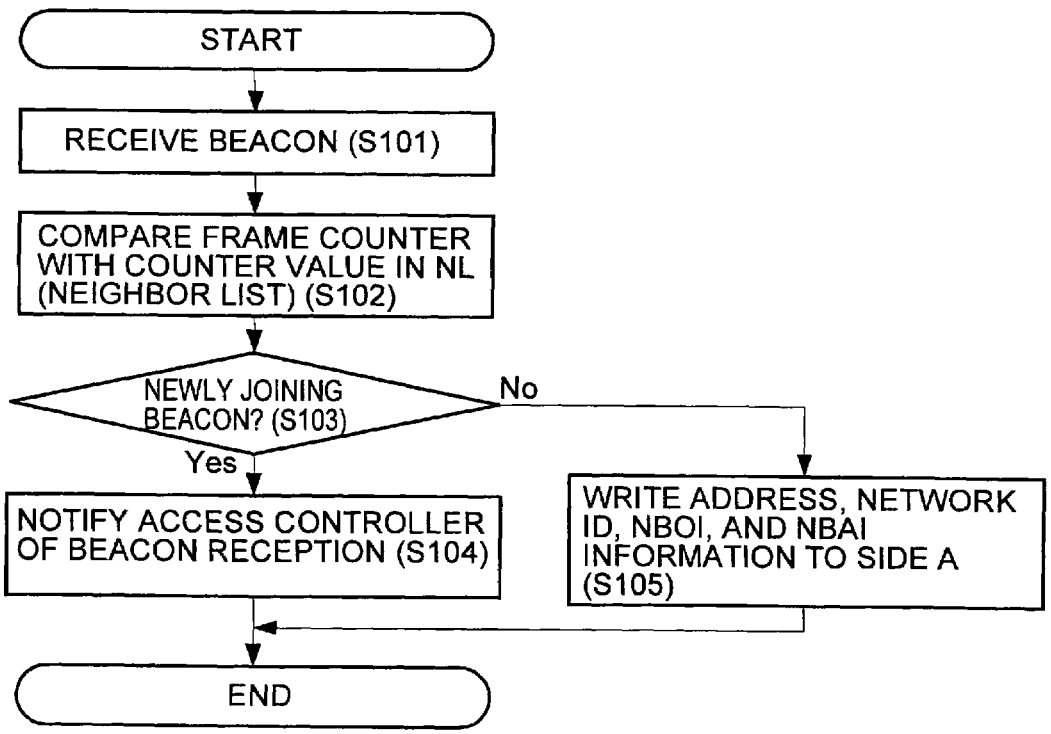
[FIG. 22]
Figure 23:
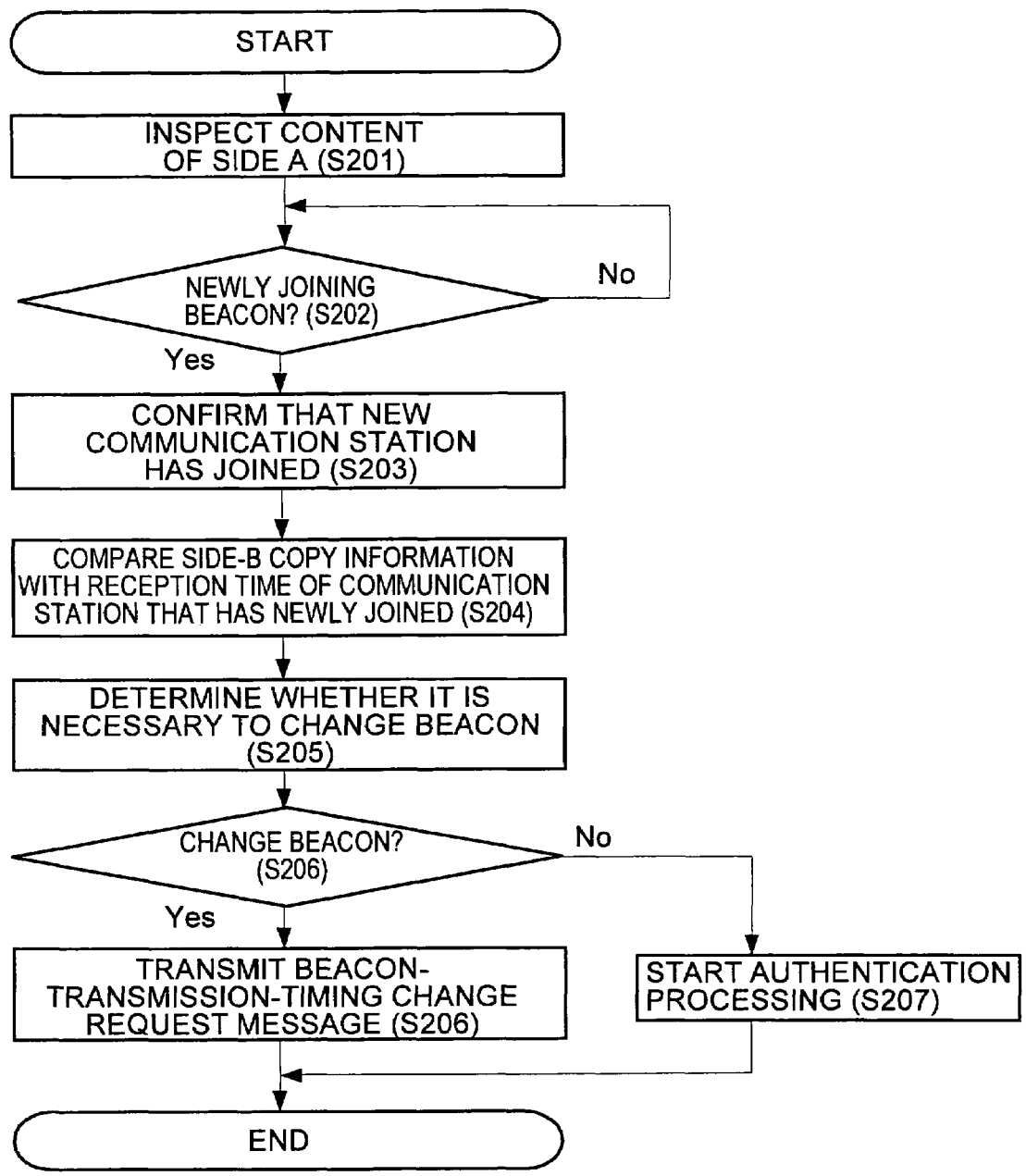
[FIG. 23]
Figure 24:
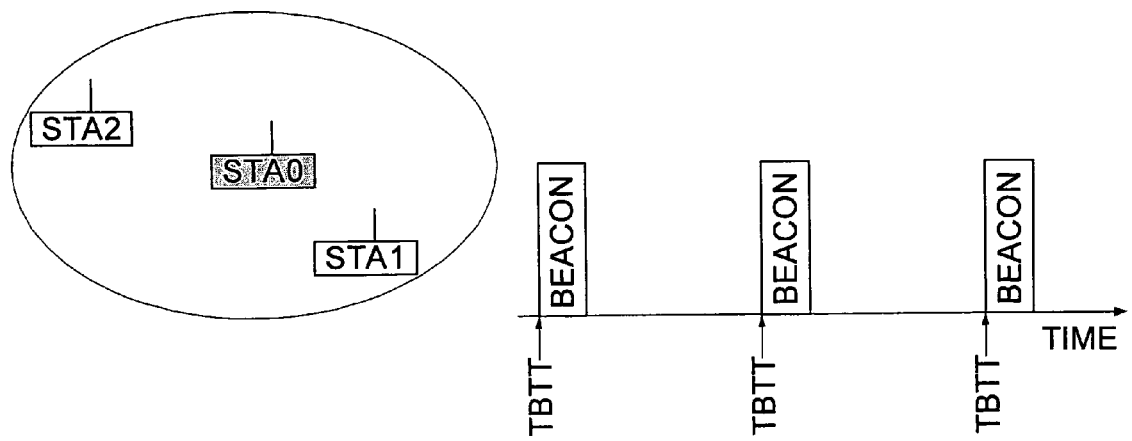
[FIG. 24]
Figure 25:
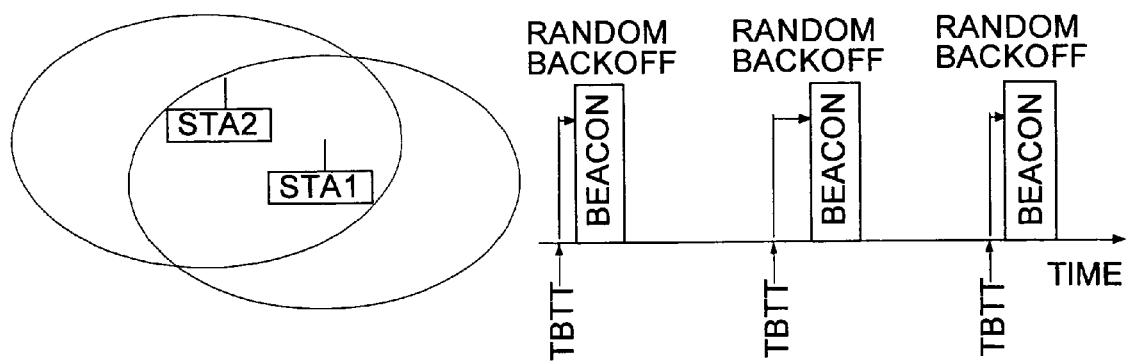
[FIG. 25]
Figure 26:
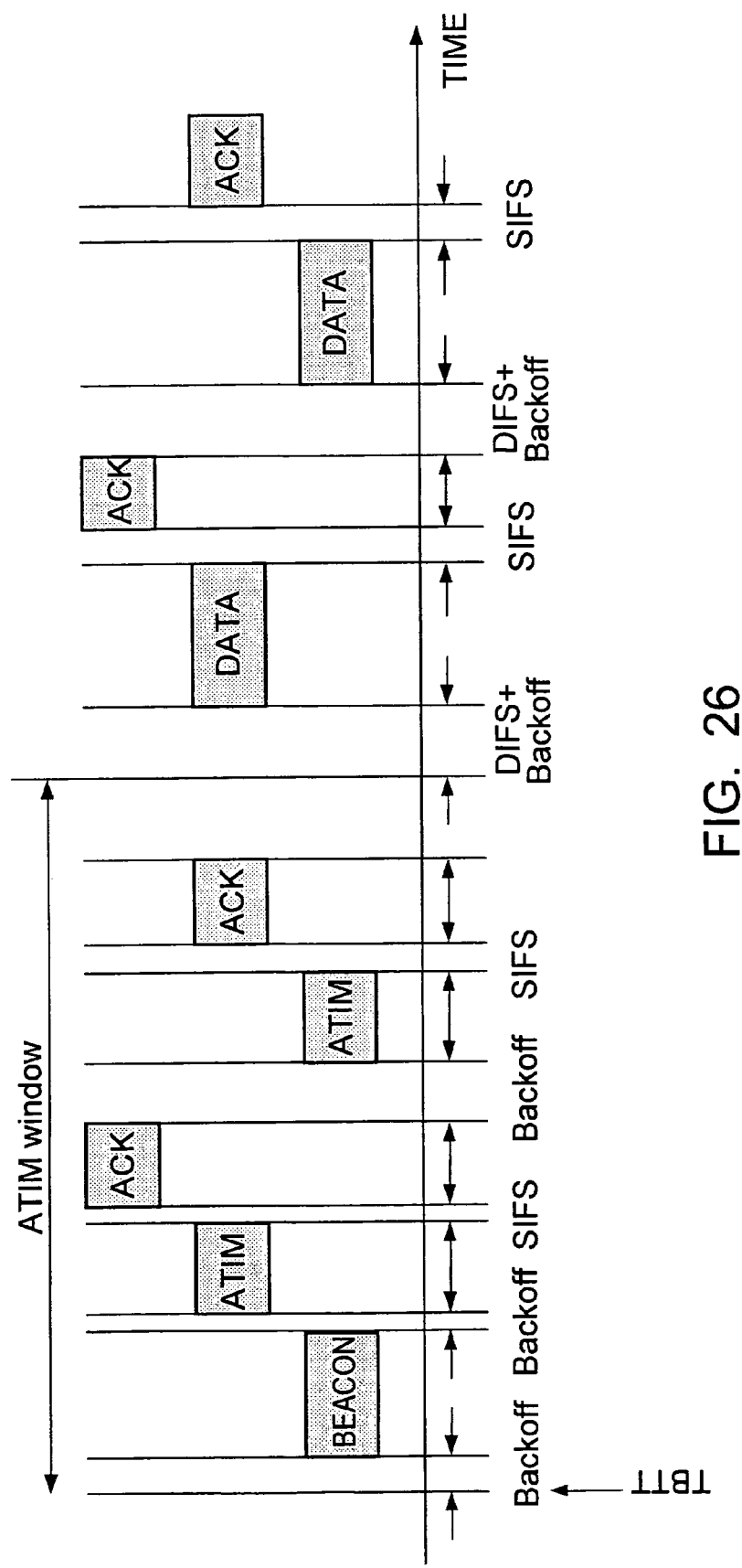
[FIG. 26]
Figure 27:
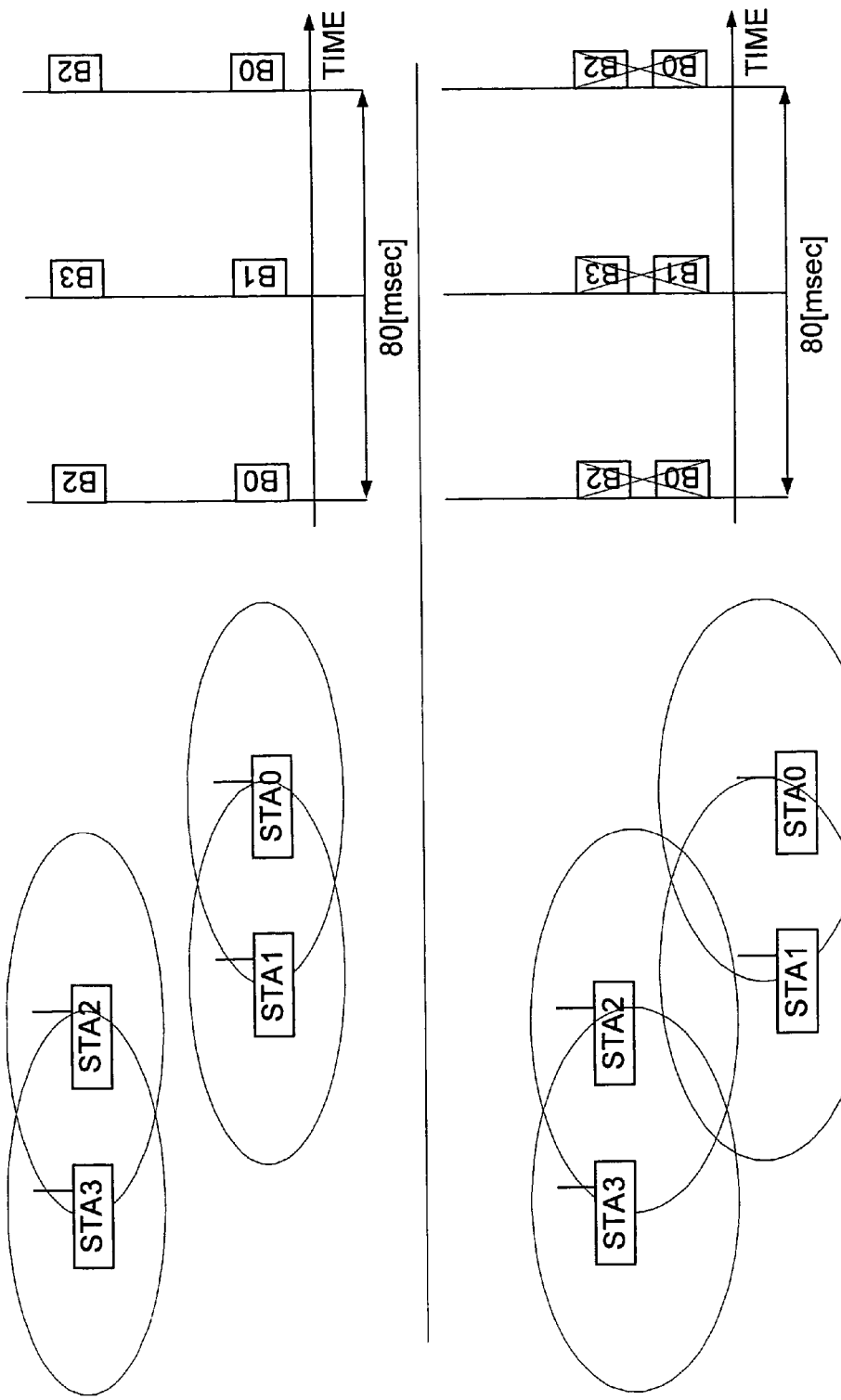
[FIG. 27]
Figure 28:
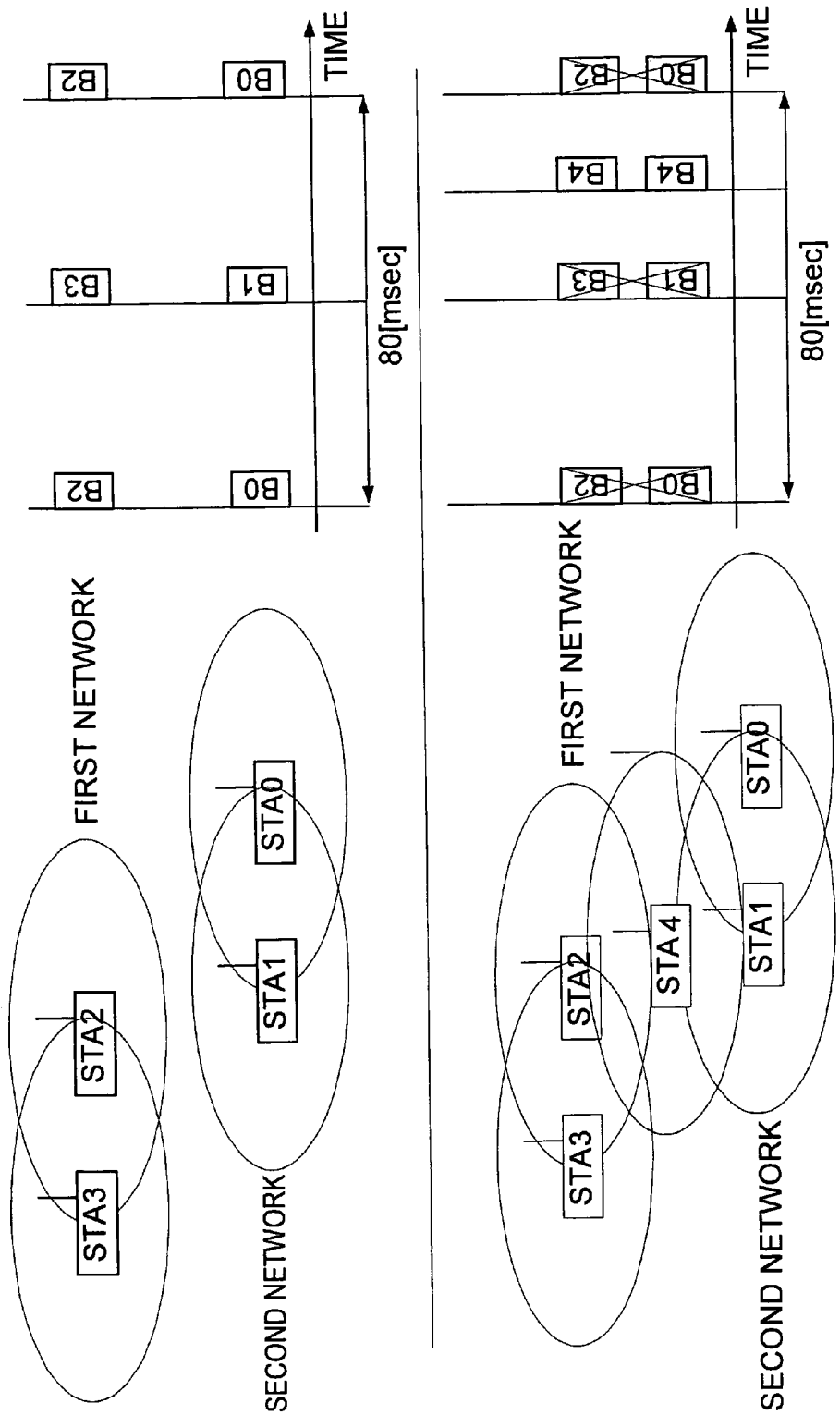
[FIG. 28]

1 . . . antenna
2 . . . antenna duplexer
3 . . . reception processing unit
4 . . . transmission processing unit
5 . . . baseband unit
6 . . . interface unit
7 . . . MAC unit
8 . . . DLC unit

The invention claimed is:

1. A wireless communication system that performs a communication operation independent of a controlling station, said wireless communication system comprising:

a plurality of communication stations each configured to
      maintain at least one neighboring-station list of neighboring communication stations and a save list of overlapping neighboring communication stations,
      transmit a beacon signal, including a beacon reception timing information, at a predetermined frame period,
      manage a neighboring communication station in accordance with the beacon signal from another communication station,
      issue a request to change a beacon transmission timing upon an overlap between an overlapping beacon signal from the overlapping communication station and beacon reception timing information in the neighboring-station list of the communication station,
   wherein the overlapping neighboring communication station that receives the request is configured to find an open time in the predetermined frame period and is configured to set the beacon transmission timing of said overlapping communication station, the overlapping neighboring communication stations employing beacon reception timing information that overlaps beacon reception timing information of communication stations in the neighboring-station list, and the beacon reception timing information of the overlapping neighboring communication stations in the save list cannot be placed in the predetermined frame period.

2. The wireless communication system according to claim 1, wherein each communication station is configured to describe a beacon reception timing in a neighboring beacon information field in the beacon signal, and is configured to create the at least one neighboring-station list regarding a beacon signal placement of a neighboring communication station in the predetermined frame period in accordance with the beacon reception timing and a description in the neighboring beacon information field in a received beacon signal.

3. The wireless communication system according to claim 1, wherein each communication station is configured to transmit the beacon signal at a time including a beacon transmission timing set at the predetermined frame period and a random offset.

4. The wireless communication system according to claim 1, wherein a first communication station of the plurality of communication stations is configured to find an open time in the predetermined frame period, is configured to set a beacon transmission timing, and is configured to transmit a message to notify of the change in a beacon position, upon an overlap between an overlapping beacon signal from the overlapping communication station and beacon reception timing information in the neighboring-station list of the first communication station.

5. The wireless communication system according to claim 4, wherein the first communication station is configured to notify of the change in the beacon position with information including an indication of a reception by the first communication station of a beacon signal transmitted at a specific time.

6. The wireless communication system according to claim 4, wherein, upon the identification of the open time in the predetermined frame period, the first communication station is configured to shift the beacon transmission timing in accordance with a predetermined algorithm.

7. A wireless communication system that performs a communication operation without a relationship of a controlling station and a controlled station, said communication system comprising:

a plurality of communication stations that are each configured to maintain at least one neighboring-station list of neighboring communication stations and a save list of overlapping neighboring communication stations, are each configured to transmit a beacon signal at a predetermined frame period and are each configured to manage a neighboring station in accordance with beacon reception timing from another communication station, wherein a first communication station of the plurality of communication stations is configured to find a time at which no beacon is placed in the predetermined frame period, is configured to set a beacon transmission timing and is configured to transmit a message notifying of a change in a beacon position, when a communication station that overlaps beacon reception timing managed in a neighboring-station list that is managed by the first communication station appears, when the first communication station finds the time at which no beacon is placed to set the beacon transmission timing, the first communication station performs processing upon recognizing the presence of a beacon based on a beacon placement information from another communication station, even without the first communication station receiving the beacon, and the overlapping neighboring communication stations employ beacon reception timing information that overlaps beacon reception timing information of communication stations in the neighboring-station list and the overlapping neighboring communication stations cannot be placed in the predetermined frame period.

8. A wireless communication system that performs a communication operation independently of a controlling station, the communication system comprising:

a plurality of communication stations, each configured to transmit a beacon signal at a predetermined frame period, each communication station being configured to manage a neighboring station in accordance with beacon reception timing from another communication station, wherein a first communication station of the plurality of communication stations is configured to manage a network in accordance with a neighboring-station list in which a beacon reception timing information from a neighboring communication station that can be placed in the predetermined frame period is described and a save list of a neighboring station having beacon reception timing information that cannot be placed in the predetermined frame period, the beacon reception timing information from the neighboring communication station in the save list overlapping with the beacon reception timing information of the neighboring communication station in the neighboring-station list, and the first communication station is configured to issue a request to change a beacon transmission timing upon an overlap between a beacon signal from the neighboring communication station in the save list and beacon reception timing information in the neighboring-station list of the first communication station, and the neighboring communication station in the save list that receives the request is configured to find an open time in the predetermined frame period and is configured to set the beacon transmission timing of said neighboring communication station.

9. The wireless communication system according to claim 8, wherein the first communication station is configured to issue a request to change a beacon transmission timing until a communication station described in the save list is relocated to the neighboring-station list.

10. The wireless communication system according to claim 8, wherein the first communication station is configured to wait until the communication station described in the save list is relocated to the neighboring-station list.

11. The wireless communication system according to claim 8, wherein the neighboring-station list in which the beacon reception timing information is described is managed using indices in which a timing information is predetermined.

12. A wireless communication system that performs a communication operation without a relationship of a controlling station and a controlled station, the communication system comprising:

a plurality of communication stations that are each configured to transmit a beacon signal at a predetermined frame period and are each configured to manage a neighboring station in accordance with beacon reception timing from another communication station, wherein a first communication station of the plurality of communication stations is configured to manage a network in accordance with a neighboring-station list in which a beacon reception timing information from a neighboring communication station that can be placed in the predetermined frame period is described and a save list of a neighboring station that cannot be placed in the predetermined frame period, and the first communication station comprises a first neighboring-station-list storage area to write, in a communication-protocol lower layer, a newly-received beacon reception timing and a second neighboring-station-list storage area to write, in a communication-protocol upper layer, the neighboring-station list in which the beacon reception timing information from the neighboring station that can be placed in the predetermined frame period and the save list of a neighboring station that cannot be placed in the predetermined frame period.

13. The wireless communication system according to claim 12, wherein the communication-protocol upper layer is configured to write the beacon reception timing information described in the first neighboring-station-list storage area to the second neighboring-station-list storage area, and is configured to schedule a beacon placement in the frame period by issuing a request to change a beacon transmission timing until the communication station described in the neighboring-station save list is relocated to the neighboring-station list.

14. The wireless communication system according to claim 12, wherein the communication-protocol upper layer is configured to write the beacon reception timing information described in the first neighboring-station-list storage area to the second neighboring-station-list storage area, and is configured to wait until the communication station described in the neighboring-station save list is relocated to the neighboring-station list, to schedule a beacon placement in the predetermined frame period.

15. A wireless communication apparatus that operates in a wireless communication environment independently a controlling station, the wireless communication apparatus comprising:

controlling means for controlling wireless data transmission and reception operation performed by a communicating means;

beacon-signal issuing means for issuing a beacon signal at a predetermined frame period in a range of communication by the communicating means; and neighboring-station managing means for managing a neighboring communication station in accordance with at least one neighboring-station list that includes beacon reception timing information from another communication station, and a save list that includes overlapping beacon reception timing information from an overlapping communication station, the neighboring-station managing means issuing a request to change a beacon transmission timing, when a beacon signal from another communication station that overlaps beacon reception timing in the neighboring-station list of the wireless communication apparatus is identified, wherein the overlapping neighboring communication stations employ overlapping beacon reception timing information that overlaps beacon reception timing information of communication stations in the neighboring-station list, the beacon reception timing information of the overlapping neighboring communication stations in the save list cannot be placed in the predetermined frame period, and the beacon-signal issuing means finds an open time in the predetermined frame period to set the beacon transmission timing, in response to the request to change the beacon transmission timing.

16. The wireless communication apparatus according to claim 15, wherein the beacon-signal issuing means is configured to describe a beacon reception timing in a neighboring-beacon information field in a beacon signal; and in accordance with the beacon reception timing and a description in the neighboring-beacon information field in a received beacon signal, the neighboring station management means is configured to create a neighboring-station list regarding a beacon placement of a neighboring communication station in the predetermined frame period, thereby managing a network.

17. The wireless communication apparatus according to claim 15, wherein the beacon-signal issuing means is configured to transmit the beacon signal at a time including the beacon transmission timing set at the predetermined frame period and a random offset.

18. The wireless communication apparatus according to claim 16, wherein, in accordance with the neighboring-beacon information field in the received beacon signal, the beacon-signal issuing means is configured to find an open time in the predetermined frame period to set the beacon transmission timing.

19. The wireless communication apparatus according to claim 18, further comprising means for transmitting a message to notify of a change in the beacon transmission timing.

20. The wireless communication apparatus according to claim 15, further comprising means for transmitting a message notifying of a change in the beacon transmission timing.

21. A wireless communication apparatus that operates in a wireless communication environment independently of a controlling station, the wireless communication apparatus comprising:

controlling means for controlling wireless data transmission and reception operation performed by a communicating means, beacon-signal issuing means for issuing a beacon signal at a predetermined frame period in a range of communication by the communicating means, neighboring-station managing means for managing a neighboring station in accordance with a beacon reception timing from another communication station, a neighboring-station list in which a beacon reception timing information from a neighboring communication station that can be placed in the predetermined frame period is described and a save list of a neighboring station having beacon reception timing information that cannot be placed in the predetermined frame period, the beacon reception timing information from the neighboring communication station in the save list overlapping with the beacon reception timing information of the neighboring communication station in the neighboring-station list, wherein the neighboring-station managing means issues a request to change a beacon transmission timing, when a beacon signal from another communication station that overlaps beacon reception timing in the neighboring-station list of the wireless communication apparatus is identified and said another communication station that receives the request finds an open time in the predetermined frame period and sets the beacon transmission timing of said another communication station.

22. The wireless communication apparatus according to claim 21, wherein the neighboring-station managing means is configured to issue a request to change a beacon transmission timing until the neighboring communication station described in the save list is relocated to the neighboring-station list.

23. A wireless communication apparatus that operates in a wireless communication environment without a relationship of a controlling station and a controlled station, the wireless communication apparatus comprising:

controlling means for controlling wireless data transmission and reception operation performed by a communicating means, beacon-signal issuing means for issuing a beacon signal at a predetermined frame period in a range of communication by the communicating means, neighboring-station managing means for managing a neighboring station in accordance with a beacon reception timing from another communication station, wherein the neighboring-station managing means is configured to manage a network in accordance with a neighboring-station list in which a beacon reception timing information from a neighboring communication station that can be placed in the predetermined frame period is described and a save list of a neighboring station that cannot be placed in the predetermined frame period, and the neighboring-station managing means comprises a first neighboring-station-list storage area to write, in a communication-protocol lower layer, a newly-obtained beacon reception timing and a second neighboring-station-list storage area to write, in a communication-protocol upper layer, the neighboring-station list in which the beacon reception timing information from the neighboring station that can be placed in the predetermined frame period and the save list of the neighboring communication station that cannot be placed in the predetermined frame period.

24. The wireless communication system according to claim 23, wherein the communication-protocol upper layer is configured to write the beacon reception timing information described in the first neighboring-station-list storage area to the second neighboring-station-list storage area, and is configured to schedule a beacon placement in the predetermined frame period with a request to change the beacon transmission timing until the communication station described in the save list is relocated to the neighboring-station list.

25. A wireless communication method for causing a wireless communication station to operate in a wireless communication environment independently of a controlling station, the wireless communication method comprising:

issuing, from the wireless communication station, a beacon signal at a predetermined frame period in a communication range of the wireless communication station;

managing, from the wireless communication station, a neighboring station in accordance with at least one neighboring-station list that includes beacon reception timing information from another communication station, and a save list that includes overlapping beacon reception timing information from an overlapping communication station; and issuing, from the wireless communication station, a request to change a beacon transmission timing upon an overlap between an overlapping beacon signal from the overlapping communication station and beacon reception timing information in the neighboring-station list of the wireless communication station, wherein the overlapping neighboring communication station that receives the request is configured to find an open time in the predetermined frame period and is configured to set the beacon transmission timing of said overlapping communication station, the overlapping neighboring communication station employing overlapping beacon reception timing information that overlaps beacon reception timing information of communication stations in the neighboring-station list, and the beacon reception timing information of the overlapping neighboring communication stations in the save list cannot be placed in the predetermined frame period.

26. The wireless communication method according to claim 25, wherein, in the beacon-signal issuing step, a beacon reception timing of the communication station is described in a neighboring-beacon information field in the beacon signal, and in the neighboring-station management step, in accordance with the beacon reception timing and a description in the neighboring-beacon information field in a received beacon signal, neighboring-station list regarding a beacon signal placement of a neighboring communication station in the predetermined frame period, is created, thereby managing a network.

27. The wireless communication method according to claim 25, wherein, in the beacon-signal issuing step, the beacon signal is transmitted at time obtained by randomly offsetting the beacon transmission timing set at the predetermined frame period.

28. The wireless communication method according to claim 26, wherein, in the beacon-signal issuing step, in accordance with the neighboring-beacon information field in the beacon signal received from another communication station, an open time in the predetermined frame period is found and the beacon transmission timing of the communication station is set.

29. The wireless communication method according to claim 28, further comprising means for transmitting a message notifying of a change in the beacon transmission timing.

30. The wireless communication method according to claim 25, further comprising-means for transmitting a message notifying of a change in the beacon transmission timing.

31. A wireless communication method for causing a wireless communication station to operate in a wireless communication environment independently of a controlling station, the wireless communication method comprising:

issuing, from the wireless communication station, a beacon signal at a predetermined frame period in a communication range of the wireless communication station, managing, from the wireless communication station, a neighboring station in accordance with beacon reception timing from another communication station, a neighboring-station list in which beacon reception timing information from a neighboring communication station that can be placed in the predetermined frame period is described and a save list of a neighboring communication station having beacon reception timing information that cannot be placed in the predetermined frame period, the beacon reception timing information from the neighboring communication station in the save list overlapping with the beacon reception timing information of the neighboring communication station in the neighboring-station list; and issuing, from the wireless communication station, a request to change a beacon transmission timing upon an overlap between an overlapping beacon signal from the neighboring communication station in the save list and beacon reception timing information in the neighboring-station list of the wireless communication station, wherein the neighboring communication station in the save list that receives the request finds an open time in the predetermined frame period and sets the beacon transmission timing of said neighboring communication station in the save list.

32. The wireless communication method according to claim 31, wherein, the neighboring-station managing step includes issuing a request for changing the beacon transmission timing until the communication station described in the save list is relocated to the neighboring-station list.

33. A wireless communication method for operation in a wireless communication environment without a relationship of a controlling station and a controlled station, the wireless communication method comprising:

a beacon-issuing step of issuing a beacon signal at a predetermined frame period in a communication range, a neighboring-station managing step of managing a neighboring station in accordance with beacon reception timing from another communication station, wherein, the neighboring-station managing step, includes managing a network in accordance with a neighboring-station list in which beacon reception timing information from a neighboring communication station that can be placed in the predetermined frame period is described and a save list of a neighboring communication station that cannot be placed in the predetermined frame period, and the neighboring-station managing step includes managing the network by using a first neighboring-station-list storage area to write, in a communication-protocol lower layer, a newly-obtained beacon reception timing and a second neighboring-station-list storage area to write, in a communication-protocol upper layer, the neighboring-station list in which the beacon reception timing information from the neighboring station that can be placed in the predetermined frame period and the save list of the neighboring station that cannot be placed in the predetermined frame period.

34. The wireless communication method according to claim 33, wherein the neighboring-station managing step comprises a sub-step of writing the beacon reception timing information described in the first neighboring-station-list storage area to the second neighboring-station-list storage area and a sub-step of scheduling the beacon signal placement in the predetermined frame period by issuing a request to change the beacon transmission timing until the communication station described in the save list is relocated to the neighboring-station list.

35. A computer readable medium storing computer-readable instructions for causing a wireless communication station to operate in a wireless communication environment independently of a controlling station, the computer-readable instructions, when executed by a computer, cause the computer to perform the method comprising:

issuing a beacon signal at a predetermined frame period in a communication range of the wireless communication station;

managing a neighboring station in accordance with at least one neighboring-station list that includes beacon reception timing from another communication station, and a save list that includes overlapping beacon reception timing information from an overlapping communication station; and issuing, from the wireless communication station, a request to change a beacon transmission timing upon an overlap between an overlapping beacon signal from the overlapping communication station and beacon reception timing information in the neighboring-station list of the wireless communication station, wherein the overlapping neighboring communication station that receives the request is configured to find an open time in the predetermined frame period and is configured to set the beacon transmission timing of said overlapping communication station, the overlapping neighboring communication station employing overlapping beacon reception timing information that overlaps beacon reception timing information of communication stations in the neighboring-station list, and the beacon reception timing information of the overlapping neighboring communication stations in the save list cannot be placed in the predetermined frame period.

* * * * *